US009235465B2

(12) United States Patent
Cho et al.

(10) Patent No.: US 9,235,465 B2
(45) Date of Patent: Jan. 12, 2016

(54) RECURSIVELY DETERMINED INVERTIBLE SET APPROACH TO CORRECT MULTIPLE STUCK-AT FAULTS IN REWRITABLE MEMORY

(71) Applicants: Sangyeun Cho, Pittsburgh, PA (US); Rami G. Melhem, Pittsburgh, PA (US)

(72) Inventors: Sangyeun Cho, Pittsburgh, PA (US); Rami G. Melhem, Pittsburgh, PA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 330 days.

(21) Appl. No.: 13/911,273

(22) Filed: Jun. 6, 2013

(65) Prior Publication Data
US 2013/0332799 A1 Dec. 12, 2013

Related U.S. Application Data

(60) Provisional application No. 61/656,295, filed on Jun. 6, 2012.

(51) Int. Cl.
*G06F 11/00* (2006.01)
*G06F 11/10* (2006.01)
(52) U.S. Cl.
CPC ............ *G06F 11/10* (2013.01); *G06F 11/1012* (2013.01)

(58) Field of Classification Search
CPC ... G06F 11/012; G06F 11/1048; G06F 11/10; G11C 29/52
See application file for complete search history.

(56) References Cited

U.S. PATENT DOCUMENTS

2013/0013977 A1* 1/2013 Rivers et al. .................. 714/763

OTHER PUBLICATIONS

Jiang et al., LLS: Cooperative integration of wear-leveling and salvaging for PCM main memory, 2011, IEEE, pp. 221-232.*

* cited by examiner

*Primary Examiner* — Shelly A Chase
(74) *Attorney, Agent, or Firm* — Kegler Brown Hill & Ritter; James J. Pingor

(57) ABSTRACT

Systems and methods are disclosed that facilitate storage and retrieval of data to/from memory with permanent faults. Permanent "stuck at" faults, associated with individual bits, interfere with Write operations. A memory bit with the SA-0 fault does not store the value "1" while a memory bit with the SA-1 fault does not store the value "0". Hence, when later retrieved by a Read operation, stored data located on one or more bits having a permanent fault may be different from the data that was originally written. Techniques are disclosed that facilitate correct retrieval of data in the presence of "stuck at" faults by keeping track of the positions of the bits that are stuck at a value different from the ones that are written and then, at Read time, inverting the values read from those positions.

20 Claims, 20 Drawing Sheets

RECURSIVELY DETERMINED INVERTIBLE SET APPROACH TO CORRECT MULTIPLE STUCK-AT FAULTS IN REWRITABLE MEMORY

CROSS-REFERENCE TO RELATED APPLICATIONS

This application claims the benefit of U.S. Provisional Patent application Ser. No. 61/656,295 entitled 'A RECURSIVELY DETERMINED INVERTIBLE SET APPROACH TO CORRECT MULTIPLE STUCK-AT FAULTS IN REWRITABLE MEMORY' and filed Jun. 6, 2012. The entirety of the above-noted application is incorporated by reference herein.

BACKGROUND

Error correction code (ECC) such as SEC-DED (single error correction, double error detection) has been successfully used to protect main memory. However, traditional hamming code based ECC is designed for a general fault model and its overhead is unnecessarily large for the stuck-at fault model. This is especially true when the probability of having multiple bit errors is high, as is the case with resistive memories (e.g., phase-change memory (PCM), spin-transfer torque random-access memory (STT-RAM), memristor, etc.). In an example scenario, many cells in a memory block might reach their write endurance limit simultaneously. To cope with many faults, a correspondingly stronger ECC would need to be employed, which would incur excessively large space and computation overheads. In fact, for NAND flash memory, also suffering write endurance limitation, ECC is required to correct 40 or more bits per 512-byte block. Subsequently, recently proposed error masking techniques for resistive memories combine microarchitectural and coding ideas to cut down overheads.

The exploration of ECC can be traced many years back. Among many ECC schemes, SEC-DED is widely used to protect dynamic RAM (DRAM) in main memory. Since DRAM errors are typically transient and occur infrequently, SEC-DED is adequate in most situations. On the other hand, resistive memories have different failure mechanisms and are subject to multiple bit faults that occur gradually over the lifetime of a chip. Consequently, it is necessary to deploy a multi-bit error correction scheme. Hamming code based BCH (Bose, Ray-Chaudhuri, and Hocquenghem) code is one such scheme. Yet, codes based on BCH are complex and expensive to implement. As a matter of fact, the complexity increases linearly with the number of faults to be tolerated.

There are three recent proposals that target specifically masking errors in resistive memories with higher auxiliary storage efficiency than traditional ECC techniques. First, ECP (Error Correcting Pointer) provides a limited number of programmable "correction entries." A correction entry holds a pointer (address) to a faulty cell within the protected block and a "patch" cell that replaces the faulty one. When a faulty cell is detected, a new correction entry is allocated to cover the cell. A memory block is decommissioned when the number of faulty cells exceeds that of the correction entries. In essence, ECP provides cell-level spares to each block.

SAFER (Stuck-at-Fault Error Recovery) dynamically partitions a protected data block into a number of groups so that each group contains at most one faulty cell. When the value of the faulty cell is different from the intended value to be written, all cells in the group are written and read inverted. If the data block is to be partitioned into n groups, then SAFER allows $\log_2 n$ "repartitions." Repartitioning is done whenever a new fault is detected. Therefore, SAFER guarantees the recovery from $\log_2 n+1$ faults. Any additional fault is tolerated only if it occurs in a fault-free group. Otherwise, the block has to be retired. SAFER was shown to provide stronger error correction than ECC or ECP at the same overhead level.

Free-p (Fine-grained Remapping with ECC and Embedded-Pointers) combines error correction and redundancy, and as such, has two protection layers. First, it uses an ECC to mask faults within a data block. Second, when a block becomes defective, Free-p embeds a pointer within the defective block so that a redundant, non-faulty block can be quickly identified without having to access a separate remapping table. Free-p employs ECC to correct up to four hard errors in a data block of cache line size and relies on the operating system (OS) to perform block remapping.

PAYG (Pay-As-You-Go) is a resilient architecture proposed to decrease the storage overhead of auxiliary bits information required by error correction schemes (e.g. ECP and SAFER) targeting the recovery from stuck-at faults. Essentially, PAYG moves from a uniform allocation of auxiliary bits across the protected memory blocks to a dynamic on demand allocation. PAYG exploits the variability in lifetime that the memory blocks exhibit and assigns additional auxiliary bits to weaker blocks.

Although conventional techniques based on SAFER are superior to ECC and ECP, they remain limited in terms of the combination of overhead required and average number of faults tolerated before failure.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods that can facilitate correct retrieval of data in the presence of permanent stuck-at faults. One example system can include a physical memory store that includes a plurality of cells, with one or more of the plurality of cells having permanent stuck-at faults. Such a system can also include a write/read component that can receive a plurality of bits to be written to the plurality of cells, and a recursively determined invertible set (RDIS) component that can identify at least one stuck-at wrong (SA-W) cell from the plurality of cells that have permanent stuck-at faults based at least in part on values associated with the plurality of bits. The RDIS component can determine an invertible set that comprises the at least one SA-W cell. The example system can also include an auxiliary information store that can maintain a plurality of auxiliary counters that specify the invertible set. The write/read component can write a bitwise complement to each cell in the invertible set and can write normally to each cell not in the invertible set, and upon a read operation, the write/read component can read a bitwise complement from each cell in the invertible set and can read normally from each cell not in the invertible set.

In another aspect of the subject innovation, it can comprise a method that can facilitate accurate retrieval of data from a memory store having one or more permanent stuck-at faults. One such example method can include the acts of receiving a plurality of bits to write to a physical memory store comprising a plurality of cells and receiving fault information associated with the physical memory store. The fault information can identify at least one stuck-at wrong (SA-W) cell from the plurality of cells based at least in part on the received plurality of bits. The example method can also include the acts of calculating an invertible set based at least in part on the received fault information, wherein the invertible set comprises the at least one SA-W cell, and storing a plurality of auxiliary counters that specify the invertible set. Additionally, such an example method can include the acts of writing a bitwise complement of a first subset of the plurality of bits to each cell in the invertible set, and writing a second subset of the plurality of bits to each cell not in the invertible set. Moreover, such a method can include the acts of reading a bitwise complement from each cell in the invertible set, reading a stored value from each cell not in the invertible set, and returning the read bitwise complement from each cell in the invertible set and the stored value from each cell not in the invertible set.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
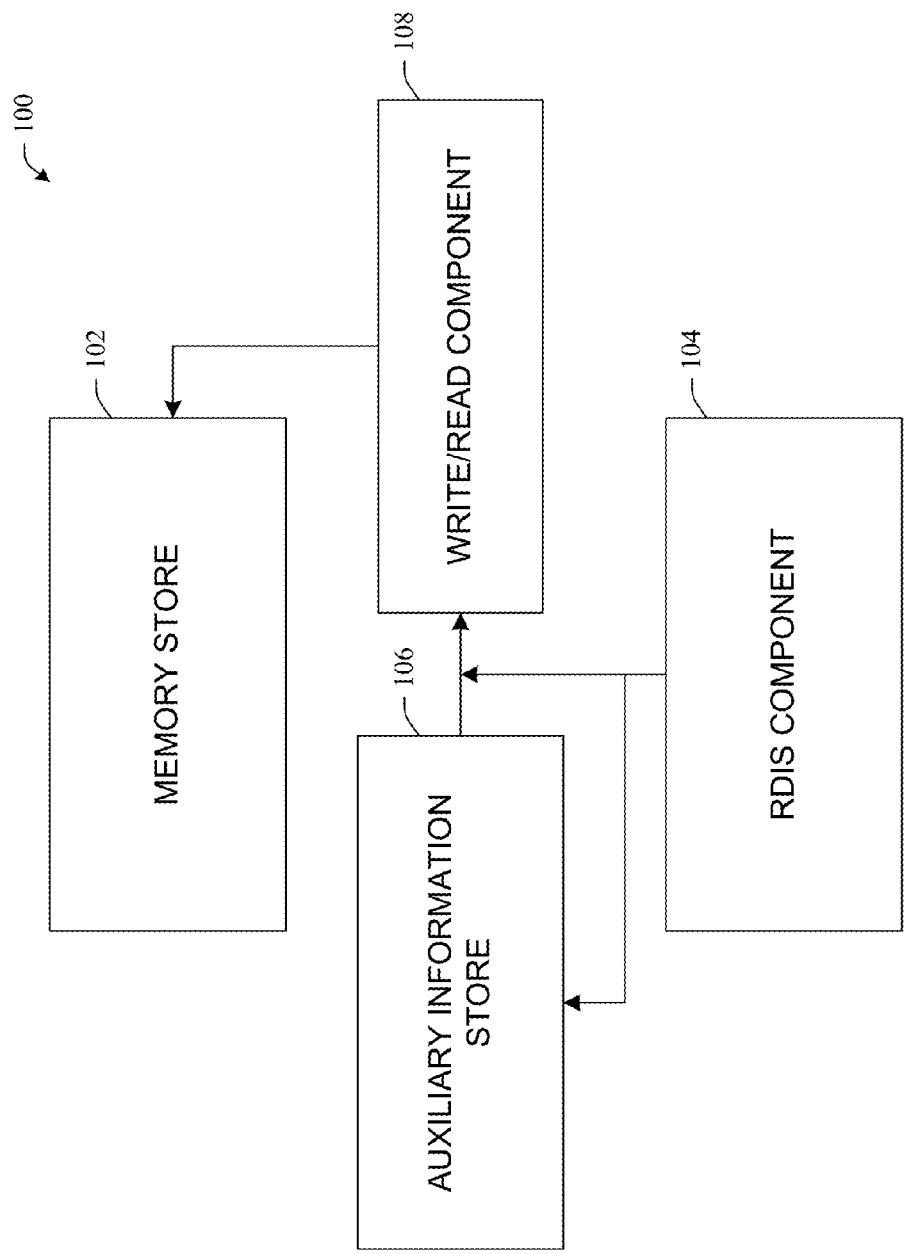
FIG. 1 illustrates an example system that can facilitate read and write operations to a memory store having one or more stuck at faults via a recursively defined invertible set (RDIS) technique in accordance with aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

In aspects, the subject innovation can employ recursively determined invertible set (RDIS) algorithms and techniques to facilitate storage and retrieval of data to/from memory with permanent faults. The memory supports two basic operations: Read and Write. Read retrieves data that has been stored at a given address (i.e., location). Write stores data to memory at a given address. Permanent "stuck at" faults, associated with individual bits, interfere with Write operations. A memory bit with the "stuck at" 0 (SA-0) fault does not store the value "1" while a memory bit with the SA-1 fault does not store the value "0". Hence, when later retrieved by a Read operation, stored data located on one or more bits having a permanent fault may be different from the data that was originally written. Systems and methods of the subject innovation can employ RDIS techniques to facilitate correct retrieval of data in the presence of "stuck at" faults by keeping track of the positions of the bits that are stuck at a value different from the ones that are written and then, at Read time, inverting the values read from those positions.

Referring initially to the drawings, FIG. 1 illustrates an example system 100 that can facilitate read and write operations to a memory store 102 having one or more stuck at faults in accordance with aspects of the subject innovation. Memory store 102 comprises a plurality of cells, with one or more cells having permanent stuck-at faults. Depending on the data to be written to the cells, there are three types of cells: a set of not faulty (NF) cells that function properly; a non-empty set of stuck-at-wrong (SA-W) cells, wherein each SA-W cell has a stuck-at fault and the value of the cell is different than the value that was attempted to be stored in the cell; and a set of stuck-at-right (SA-R) cells, wherein each SA-R cell has a stuck-at fault and the value of the cell is the same as the value that was attempted to be stored in the cell. Memory store 102 can be part or all of substantially any physical memory device as described herein, for example, part or all of a resistive memory device, etc., and can be accessed via a data buffer (not shown). System 100 can also include an RDIS (recursively determined invertible set) component 104 that can facilitate accurate retrieval of data from memory store 102, by determining an invertible set (as a subset of the plurality of cells in the memory device 102) and setting associated auxiliary counter values as described in greater detail herein, wherein the invertible set includes each SA-W cell of the memory store 102 and none of the SA-R cells of memory store 102. RDIS component 104 can send the auxiliary counter values for determining the invertible set to auxiliary information store 106, which can store the auxiliary counter values, and which can, depending upon the embodiment, either be part of the memory store 102, or can be maintained in a separate auxiliary memory store. Write/read component 108 can receive data (e.g., bits) to be written to the cells of the memory store 102 and can write data to memory store 102 and read data from memory store 102 based at least in part on the auxiliary counter values from auxiliary information store 106. When write component 108 writes data to memory store 102, write/read component can write the bitwise complement to each cell in the invertible set and write normally to each cell not in the invertible set. When write/read component 108 reads data from memory store 102, write/read component 104 can return the bitwise complement of the value of each cell within the invertible set and return the value of each cell not in the invertible set, and can then corrrectly return the data that was to be stored in memory store 102. As described in greater detail herein, when no SA-W faults exist in memory store 102 (e.g., as determined by a read-after-write, etc.), the auxiliary information and the invertible set need not be determined by RDIS component 104, and write/read component 108 can write and read normally.

Figure 2:
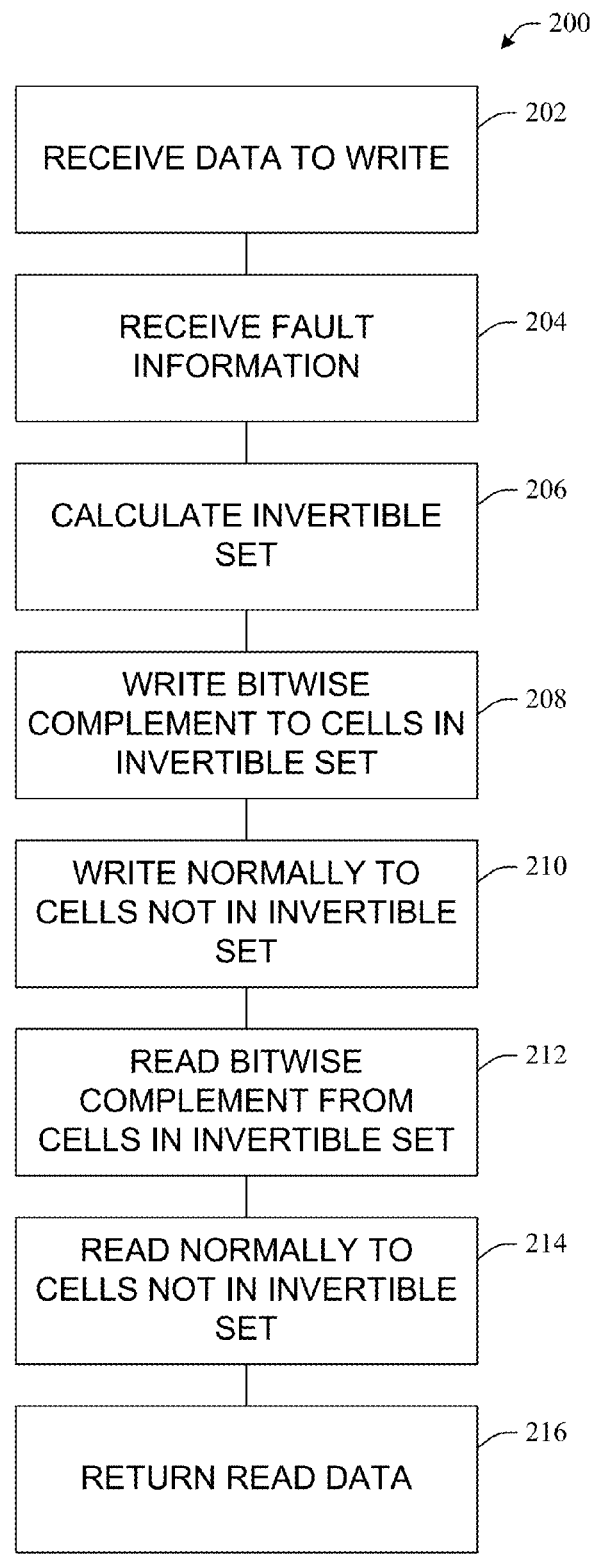
FIG. 2 illustrates a method of facilitating read and write operations to a memory store having one or more stuck at faults in accordance with aspects of the subject innovation.

FIG. 2 illustrates a method 200 of facilitating read and write operations to a memory store having one or more stuck at faults in accordance with aspects of the subject innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Method 200 can begin at act 202 by receiving data that comprises a plurality of bits to be written to a plurality of cells in a memory store. At act 204, fault information associated with the memory store can be received, wherein the fault information can specify a non-empty set of SA-W cells of a memory store and a (possibly empty) set of SA-R cells of the memory store. These sets can be determined through any of the techniques described herein, such as via accessing information designating the elements of these sets, or by calculating the elements of these sets via techniques described herein (e.g., read-after-write to determine SA-W cells, followed by subsequent determination of any SA-R cells that share a row and column with SA-W cells, etc.). At act 206, an invertible set can be calculated and auxiliary counter values can be set via RDIS techniques disclosed herein, wherein the invertible set comprises each SA-W cell of the memory store (and possibly one or more NF cells). In a write operation, at act 208, the bitwise complement of the value to be written in cells in the invertible set can be written to each cell in the invertible set, and at act 210, the value to be written to cells not in the invertible set can be written to each cell not in the invertible set. Thereafter, upon a read operation, at act 212, the bitwise complement of the value can be read from each cell in the invertible set, and at act 214 the value of each cell not in the invertible set can be read. At act 216, the values read at acts 212 and 214 can be returned, thereby returning the plurality of bits that was to be written to the memory store. Method 200 can be implemented when a stuck-at wrong fault is found (e.g., via a read-after-write operation, etc.). However, to reduce overhead, method 200 need not be implemented if no stuck-at-wrong faults are found, as write and read operations can be performed normally.

Because RDIS techniques of the subject innovation can be used in place of ECC, ECP, or SAFER as a superior form of error correction, RDIS can also be extended in similar ways. For example, the block remapping idea of Free-p is orthogonal to RDIS; hence, RDIS could be used to replace ECC in Free-p. Additionally, RDIS is compatible with the dynamic on demand bit allocation of PAYG. The auxiliary bits of RDIS could be allocated in a similar way to what is used in conventional PAYG.

As described herein, systems and methods of the subject innovation can employ RDIS (recursively defined invertible set) techniques as a low-overhead error correction scheme to recover from hard errors in memory of any type, for example, resistive memories, where RDIS techniques are particularly relevant due to the ability to correct many errors with higher probability than conventional techniques. RDIS can allow for the correct retrieval of data in the presence of stuck-at faults by keeping track of the bits that are stuck at a value different from the ones that are written, and then, at read time, by inverting the values read for those bits. For a write operation, each cell in a data block is either: "non-faulty" (NF), stuck at the opposite of the value being written ("stuck-at-wrong" or SA-W), or stuck at the same value written ("stuck-at-right" or SA-R). For example, trying to write '0' in a cell stuck at '1' makes the cell SA-W. RDIS techniques can identify and encode a subset S—out of all cells forming a data block to be updated—containing all the SA-W cells (and possibly some NF cells). Later, the members of S can be read inverted, which retrieves the data as it was intended to be written originally. RDIS can initiate the computation of S after detecting write failure through applying a read-after-write verification operation.

Although it can only guarantee the recovery from a relatively low number (e.g., three, in the two-dimensional embodiment) of faults, RDIS can effectively recover from many more faults beyond what it guarantees. Intrinsically, RDIS has a low probability of failure that increases at a very slow rate with the relative increase in the number of fault occurrences. By comparison, current state-of-the-art schemes either cannot recover from a single fault beyond a guaranteed number of faults (e.g., ECC and ECP) or can recover additional faults but with a low probability (e.g., SAFER). Results discussed herein show that RDIS can tolerate 95% more faults on average than SAFER when the protected block size is 1 KB. Given the ability to recover many faults with high probability, systems and methods employing RDIS can be highly useful in a variety of settings, in particular with resistive memories that will experience a growing number of faults over the course of use.

Theoretical results discussed below formally prove the fault tolerance properties of RDIS. Example hardware implementations discussed in accordance with aspects of the subject innovation show that the required additional logic is surprisingly simple. Systems and methods implementing RDIS techniques for error correction are not limited to main memory. Embodiments employing RDIS techniques are capable of tolerating faults significantly within block sizes ranging from cache line size to secondary storage block sector size, while incurring a low overhead. Results discussed herein present a study of RDIS error correction capability at multiple different block sizes.

RDIS techniques can be applied to a block of memory or storage cells. For ease of discussion herein, the number of cells in the block will be denoted N, with the cells denoted $c(0), \ldots, c(N-1)$, and the corresponding binary information they store denoted $b(0), \ldots, b(N-1)$. Each cell $c(i)$ is either non-faulty (NF), stuck at '0' (SA-0), or stuck at '1' (SA-1). Furthermore, RDIS techniques use a different classification of the faulty cells, depending on the value that is to be written in those cells. Specifically, when bit $b(i)$ is to be stored in a faulty cell $c(i)$, then $c(i)$ is stuck at the right value (SA-R) if it is SA-0 and $b(i)=0$ or it is SA-1 and $b(i)=1$. Similarly, $c(i)$ is stuck at the wrong value (SA-W) if it is SA-0 and $b(i)=1$ or it is SA-1 and $b(i)=0$. Using this classification, each cell $c(i)$ can be in one of three classes: NF, SA-R (when the information to store in the faulty cell is identical to the stuck value), or SA-W (when the information to store in the faulty cell is different from the stuck value).

Aspects of the subject innovation can use H-bit auxiliary information to allow the correct retrieval of the N stored bits, with the value of H as discussed herein. In some embodiments, the auxiliary information can be maintained in a separate fault-free (or relatively fault-free) storage. Alternatively, the auxiliary information can be stored in the same faulty medium as the data but adequately protected by another technique (e.g., ECP, etc.).

Denoting the memory cells $c(0), \ldots, c(N-1)$ by C, embodiments of the subject innovation that employ RDIS techniques can use the auxiliary H bits to identify a subset $S \subset C$ such that every SA-W cell is in S and every SA-R cell is in C−S. In other words, S contains all the SA-W cells of C and none of its SA-R cells. S is called an "invertible" subset of C. When the N bits of information are stored, any cell $c(i)$ in C−S will store $b(i)$ intact, while any cell in S will store the complement of $b(i)$. Subsequently, when the information is read, the content of any cell in S is complemented, thus allowing the correct retrieval of all N bits.

One simple way of expressing S is to keep a list of pointers to the SA-W cells. This requires $\log_2 N$ bits of auxiliary information for each cell and hence, to tolerate a maximum of F faults, $H=F \times \log_2 N$ bits of auxiliary information would be needed. However, systems and methods of the subject innovation employing RDIS techniques can utilize a different, yet systematic method for constructing and representing S by allowing it to include NF (not faulty) cells in addition to SA-W cells. Clearly, if a cell $c(i)$ is not faulty, then it is possible to store (and correctly retrieve) the complement of $b(i)$ in $c(i)$. Conceptually, the set S can be constructed via RDIS techniques by computing a sequence of subsets $C_2 \subset C_1 \subset C$ such that: (a) All the SA-W cells that are in C, and possibly some SA-R cells, are included in $C_1$; (b) All the SA-R cells that are in $C_1$, and possibly some SA-W cells, are included in $C_2$; and (c) With a very large probability, the size of $C_2$ is much smaller than the size of C.

Figure 3:
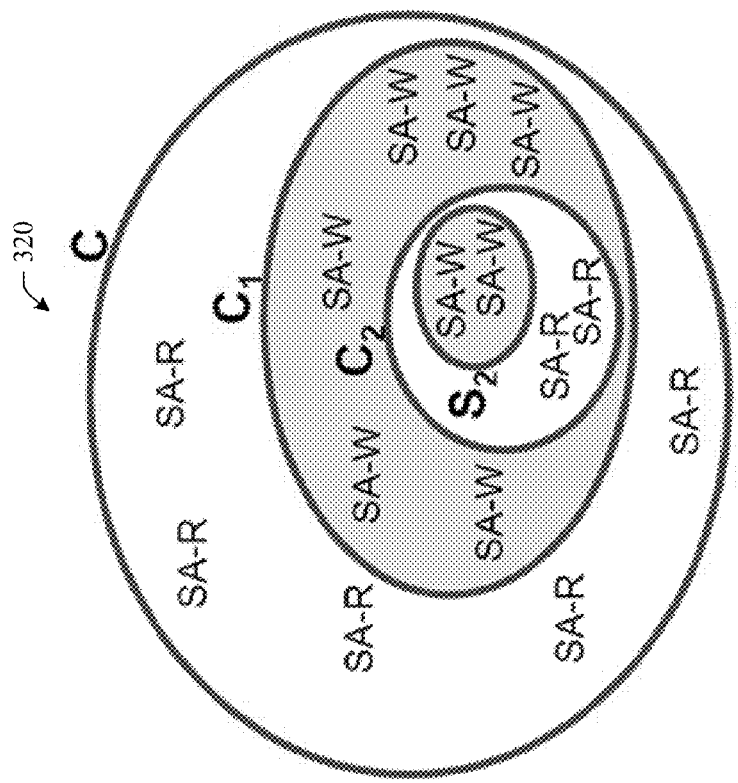
FIG. 3 illustrates an example construction of an invertible set and associated sets.
Figure 3:
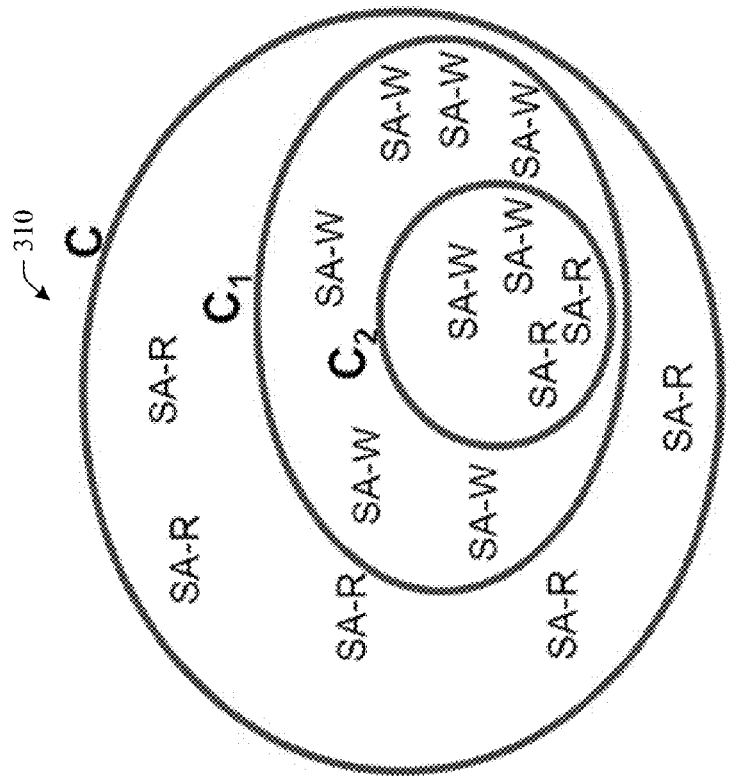

FIG. 3 illustrates the construction of $C_1$ and $C_2$ at 310. Although any of C, $C_1$, and $C_2$ can contain NF cells as well, for ease of illustration, these are not shown in FIG. 3. However, by definition, $C_1-C_2$ does not contain any SA-R cells. Clearly, if $C_1$ does not contain any SA-R cells, then the construction of $C_2$ is not needed since S can be set equal to $C_1$.

There are two possible cases if $C_1$ does contain at least one SA-R cell. First, if $C_2$ does not contain any SA-W cells, then the invertible set $S=C_1-C_2$, since $C_1-C_2$ contains all the SA-W cells of C and none of its SA-R cells. The second case occurs if $C_2$ contains some SA-W cells. In this case, embodiments of the subject innovation can recursively apply the same process to find an invertible set $S_2$ of $C_2$ which includes all its SA-W cells and none of its SA-R cells. Therefore, $S=C_1-(C_2-S2)=(C1-C2) \cup S_2$. The invertible set S of C is shown at 320 as a shaded area.

Figure 4:
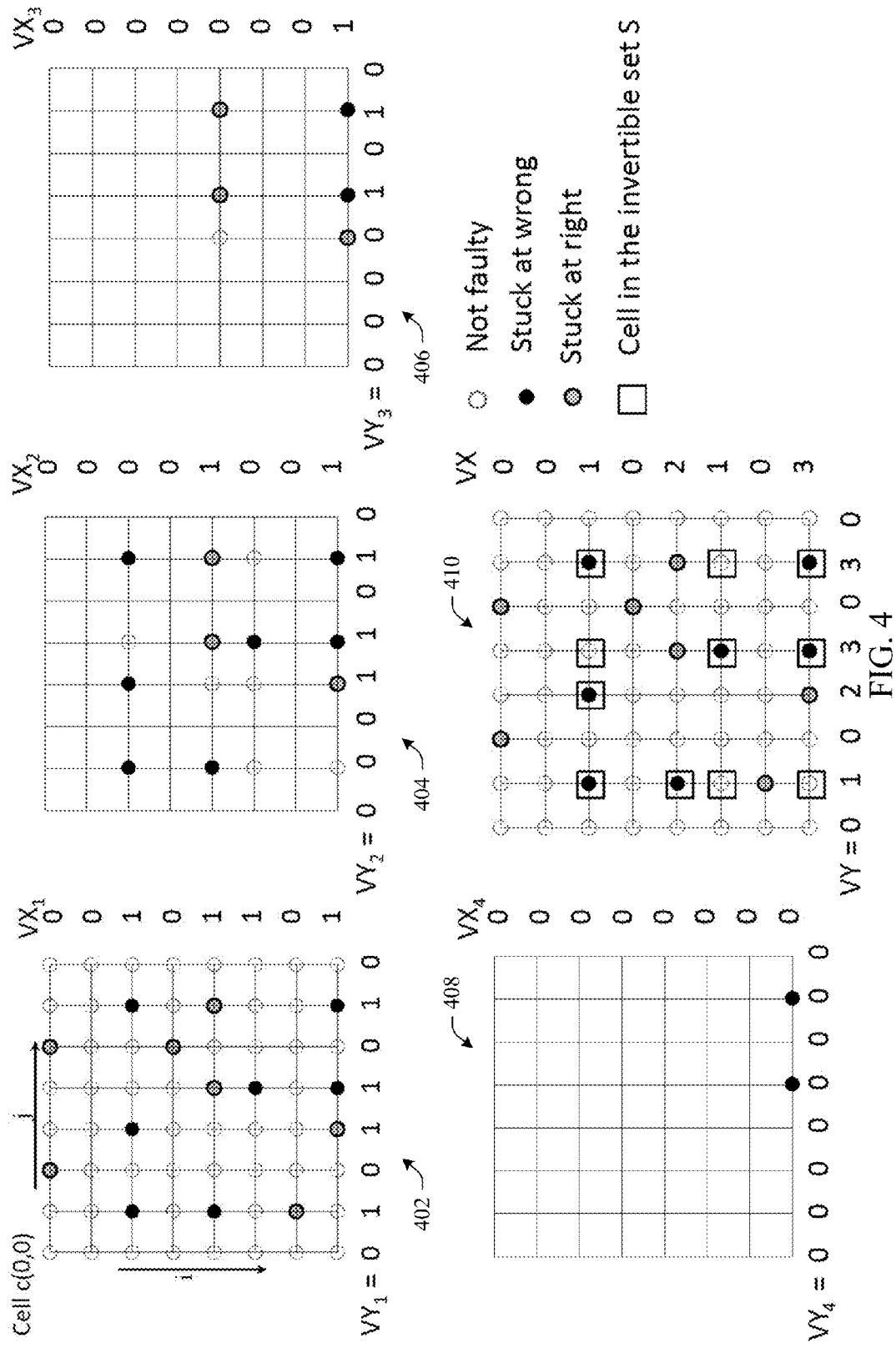
FIG. 4 illustrates an example application of an RDIS technique in accordance with aspects of the innovation to an 8×8 array.

In accordance with aspects of the innovation, one way to identify S is to arrange the N bits/cells into a logical two-dimensional array of n rows and m columns (in other aspects, a higher dimensional array can be employed) and accordingly re-label the information bits as $b(i, j)$ and the storage cells as $c(i, j)$, where $i=0, \ldots, n-1$ and $j=0, \ldots, m-1$. FIG. 4 illustrates an example application of an RDIS technique in accordance with aspects of the innovation to the 8×8 array shown in 402 to demonstrate the process of specifying the invertible set. As seen in 402, C contains 7 SA-W and 7 SA-R faults (as indicated in the legend, NF cells are denoted by an open circle, SA-R cells by a shaded circle, and SA-W cells by a filled circle).

The RDIS techniques employed by systems and methods of the subject innovation can maintain n+m auxiliary binary flags $VX_1(i), i=0, \ldots, n-1$ and $VY_1(j), j=0, \ldots, m-1$. These flags can be set, for example, such that: (a) $VX_1(i)=1$ if row i of C contains at least one SA-W cell (otherwise $VX_1(i)=0$); and (b) $VY_1(j)=1$ if column j of C contains at least one SA-W cell (otherwise $VY_1(j)=0$). Although a specific representation of this and other information discussed herein is provided for ease of illustration, it is to be appreciated that this information can be represented in other ways (e.g., transposing 0 and 1, along with other changes resulting therefrom, etc.) that are also within the scope of the subject innovation.

As used herein, $n_1$ refers to the number of rows in the n×m array C that have $VX_1=1$ and $m_1$ refers to the number of columns of C that have $VY_1=1$. Then $C_1$ can be defined as the subset of cells $\{c(i, j) | (VX_1(i)=1)$ and $(VY_1(j)=1)\}$. In other words, $C_1$ can be the $n_1 \times m_1$ subarray of C that contains: (a) SA-W cells and (b) cells that lie at the intersection of a row that contains a SA-W cell and a column that contains a SA-W cell (these can be either NF or SA-R). In the example of FIG. 4, the values of $VX_1$ and $VY_1$ are shown in 402. The SA-W cells of C are confined to rows 2, 4, 5, 7 and columns 1, 3, 4, 6, and hence, these rows and columns form the subarray C1 shown in 404.

Since $C_1$ is defined to include all the SA-W cells of C, any cell that is in $C-C_1$ is either NF or SA-R, and thus can hold the correct value of the corresponding information bit. However, the cells that are in $C_1$ may be NF, SA-W, or SA-R. If $C_1$ does not contain any SA-R cell (i.e., $C_1$ contains only NF or SA-W cells), then $S=C_1$. If, however, $C_1$ contains some SA-R cells (as is the case in 404), then, the RDIS technique can proceed to find a subset $S_1$ of $C_1$, which includes all its SA-R cells and none of its SA-W cells. This will allow specification of an invertible subset of C as $S=C_1-S_1$. To obtain $S_1$, systems and methods of the subject innovation can apply the same procedure used to extract $C_1$ from C, but after reversing the roles of SA-R and SA-W. Specifically, the following binary flags can be defined (or variations thereon): (a) $VX_2(i)=1$ if row i of $C_1$ contains at least one SA-R cell (otherwise $VX_2(i)=0$); and (b) $VY_2(j)=1$ if column j of $C_1$ contains at least one SA-R cell (otherwise $VY_2(j)=0$).

Similarly to $n_1$ and $m_1$, let $n_2$ be the number of row of $C_1$ that have $VX_2=1$, and let $m_2$ be the number of columns of $C_1$ that have $VY_2=1$. Moreover, $C_2$ can be defined as the subset of cells $\{c(i,j)|(VX_2(i)=1) \text{ and } (VY_2(j)=1\}$. In other words, $C_2$ is the $n_2 \times m_2$ subarray of $C_1$ that contains: (a) SA-R cells and (b) cells that lie at the intersection of a row that contains a SA-R cell and a column that contains a SA-R cell. In the example of FIG. 4, subarray $C_2$ can be formed to include all the SA-R cells that are in $C_1$. As seen in 406, $C_2$ is composed of rows 4, 7 and columns 3, 4, 6. By construction any cell that is in $C_1-C_2$ is either NF or SA-W. Moreover, if $C_2$ does not contain any SA-W cell, then $S_1=C_2$ and embodiments of the subject innovation can form the invertible set $S=C_1-C_2$.

In general, there is no guarantee that $C_2$ does not contain any SA-W cell. Fortunately, however, if $C_2 \neq C_1$ (i.e., $C_2$ is a proper subset of $C_1$), then embodiments of the subject innovation can apply the same procedure used to extract $C_1$ from C to compute the subset $S_2$ of $C_2$ that contains all its SA-W cells and then set $S=(C_1-C_2) \cup S_2$. The iterative process can continue to compute consecutive subarrays $C_3, \ldots, C_k$.

After a terminal number of iterations k, one of three cases will result: (a) k is odd and $C_k$ contains only SA-W cells. In this case, the invertible set S can be defined as in equation 1, $$S=(C_1-C_2) \cup (C_3-C_4) \cup \ldots \cup (C_{k-2}-C_{k-1}) \cup C_k \quad (1),$$

(b) k is even and $C_k$ contains only SA-R cells. In this case the invertible set S can be defined as in equation 2, $$S=(C_1-C_2) \cup (C_3-C_4) \cup \ldots \cup (C_{k-1}-C_k) \quad (1),$$

or (c) The progress stalls because $C_k=C_{k-1}$, in which case the set of faults cannot be masked.

With continued reference to FIG. 4, the array $C_2$ shown in 406 includes all the SA-R cells that are in $C_1$ but also contains two SA-W cells. Hence, the RDIS techniques can form subarray $C_3$ to include all the SA-W cells that are in $C_2$, as seen in 408. The process in the example of FIG. 4 terminates with k=3 because $C_3$ does not include any SA-R cells, and thus, $S=(C_1-C_2) \cup C_3$ contains all the SA-W cells that are in C and none of its SA-R cells, as seen in 410, where elements of S are indicated by a box.

The subarrays $C_1, C_2, \ldots$, can be completely specified by the binary flags $VX_1(i), VX_2(i), \ldots, i=0, \ldots, n-1$ and $VY_1(j)$, $VY_2(j), \ldots, j=0, \ldots, m-1$. In other words, these flags can form the auxiliary information that can be maintained to retrieve the correct values stored in the N cells. Note that if $VX_u(i)=0$ for some u, then $VX_v(i)=0$ for any $v>u$. Similarly, if $VY_w(i)=0$ for some w, then $VY_v(i)=0$ for any $v>w$. Hence, the flags can be compressed into two sets of counters $VX(i)$ and $VY(j)$, as seen in 410, where: $VX(i)=\Sigma_{k=1}^{u} VX_k(i)$ for $i=0, \ldots, n-1$; and $VY(j)=\Sigma_{k=1}^{w} VY_k(j)$ for $j=0, \ldots, m-1$.

The auxiliary information that can be used to reconstruct S, thus, can consist of the (n+m) counters $VX(i)$ and $VY(j)$. In various embodiments of the subject innovation, each of these counters can count up to K, therefore the number of bits, H, needed to keep the auxiliary information is $H=(n+m) \times \lceil \log_2 (K+1) \rceil$. Note that by limiting the maximum value of each counter to K, the RDIS technique operates under the assumption that the recursive construction of S will terminate in K steps. If that is not the case, then the process will fail and the given faults cannot be tolerated.

In order to store and retrieve user data, VX and VY can be computed first. Systems and methods of the subject innovation can employ RDIS algorithms to do that once the locations and nature of faults are known. In various aspects, this information can be either kept in a separate storage (e.g., a cache such as a static RAM (SRAM) cache, etc.) or can be discovered on line by a write-read-check process such as described herein. Given the fault information and the data that is to be written, each cell, $c(i,j)$, can be associated with a state that can be represented by two bits $\phi(i,j)$ and $\sigma(i,j)$ as follows: (a) $\phi(i,j)=1$ and $\sigma(i,j)=0$ when cell $c(i,j)$ is SA-R; (b) $\phi(i,j)=1$ and $\sigma(i,j)=1$ when cell $c(i,j)$ is SA-W; and (c) $\phi(i,j)=0$ and $\sigma(i,j)=0$ when cell $c(i,j)$ is NF or the fault was successfully handled.

To compute the values of the counters $VX_i$ for $i=0, n-1$ and $VY_j$ for $m=0, m-1$, systems and methods of the subject innovation can employ an algorithm such as example algorithm 1:

| Algorithm 1: Computing VX and VY |
|---|
| 1  begin |
| 2    for k ← 1 to K do |
| 3        for i ← 0 to n − 1 do |
| 4            $VX_k(i) \leftarrow \sigma(i,0) + \ldots + \sigma(i, m-1)$;  // Boolean OR |
| 5            if $VX_k(i) = 1$ then |
| 6                $VX(i) \leftarrow VX(i) + 1$; |
| 7        for j ← 0 to m − 1 do |
| 8            $VY_k(j) \leftarrow \sigma(0,j) + \ldots + \sigma(n-1, j)$;  // Boolean OR |
| 9            if $VY_k(j) = 1$ then |
| 10              $VY(j) \leftarrow VY(j) + 1$; |
| 11       if $\forall i, j\ VX_k(i) = 0$ and $VY_k(j) = 0$ then |
| 12          EXIT;  // successful completion |
| 13       /* prepare for next iteration */ |
| 14       for i ← 0 to n − 1 do |
| 15          for j ← 0 to m − 1 do |
| 16            if $VX_k(i) = 0$ or $VY_k(j) =| 0$ then |
| 17                set $\phi(i,j) \leftarrow 0$; $\sigma(i,j) \leftarrow 0$; |
| 18            else if $\phi(i,j) = 1$ then |
| 19                set $\sigma(i,j) \leftarrow \overline{\sigma(i,j)}$;  // Bit complement |
| 20       if $\exists i, j\ VX_k(i) > 0$ or $VY_k(j) > 0$ then |
| 21          FAIL;  // Given faults can't be masked |

In each iteration, k, of algorithm 1 (iterations of the for loop on line 2), the subarray which contains SA-W cells can be formed (by computing the flags $VX_k$ and $VY_k$, as seen in lines 3 to 10). Then, the state of every cell that is not in this subarray can be set to ($\phi=0$ and $\sigma=0$) since it is either NF or is SA-R (as seen in lines 16 and 17). In preparation for the next iteration, the algorithm can then change the states of every faulty cell in the identified subarray such that SA-W cells become SA-R and SA-R cells become SA-W (as seen in lines 18 and 19). The algorithm assumes that the counters VX(i) and VY(j) are initially set to zero, although in various embodiments, such a step can be included.

As can be seen from example algorithm 1, the way the counters VX(i) and VY(j) are computed implies that if cell c(i, j) is in $C_k$ and not in $C_{k+1}$ then at least one of the two counters VX(i) or VY(j) is equal to k while the other one is larger than or equal to k. Because of this, an algorithm such as example algorithm 2 can be used to store the data bits.

---
Algorithm 2: Storing data bits
---
1  begin
2    for i ← 0 to n − 1 do
3      for j ← 0 to m − 1 do
4        if min(VX(i), VY(j)) is even then
5          Store b(i, j) in c(i, j);
6        else
7          Store $\overline{b(i,j)}$ in c(i, j);
---

Similarly, when retrieving the data, the bit read from cell c(i, j) can be complemented if the minimum of VX(i) and VY(j) is an odd number.

Figure 5:
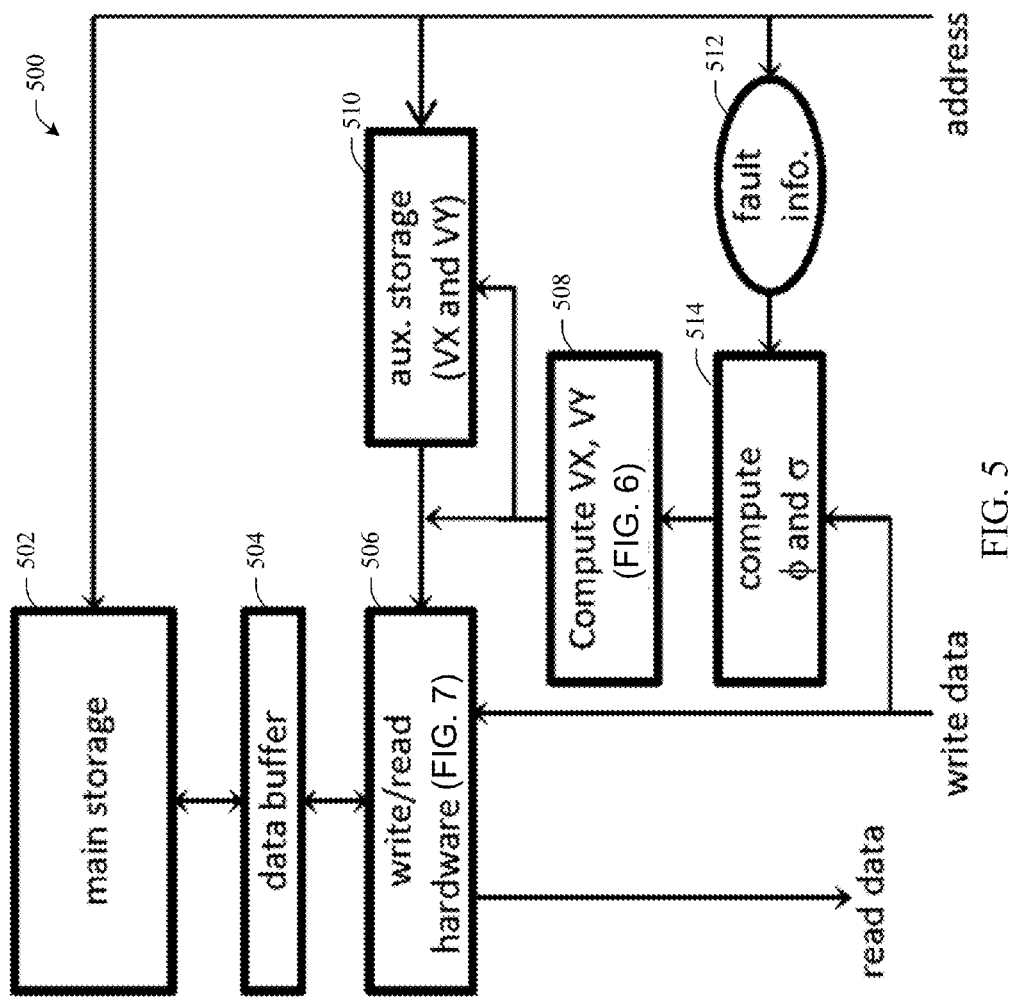
FIG. 5 illustrates an example hardware implementation of a system employing RDIS.
Figure 6:
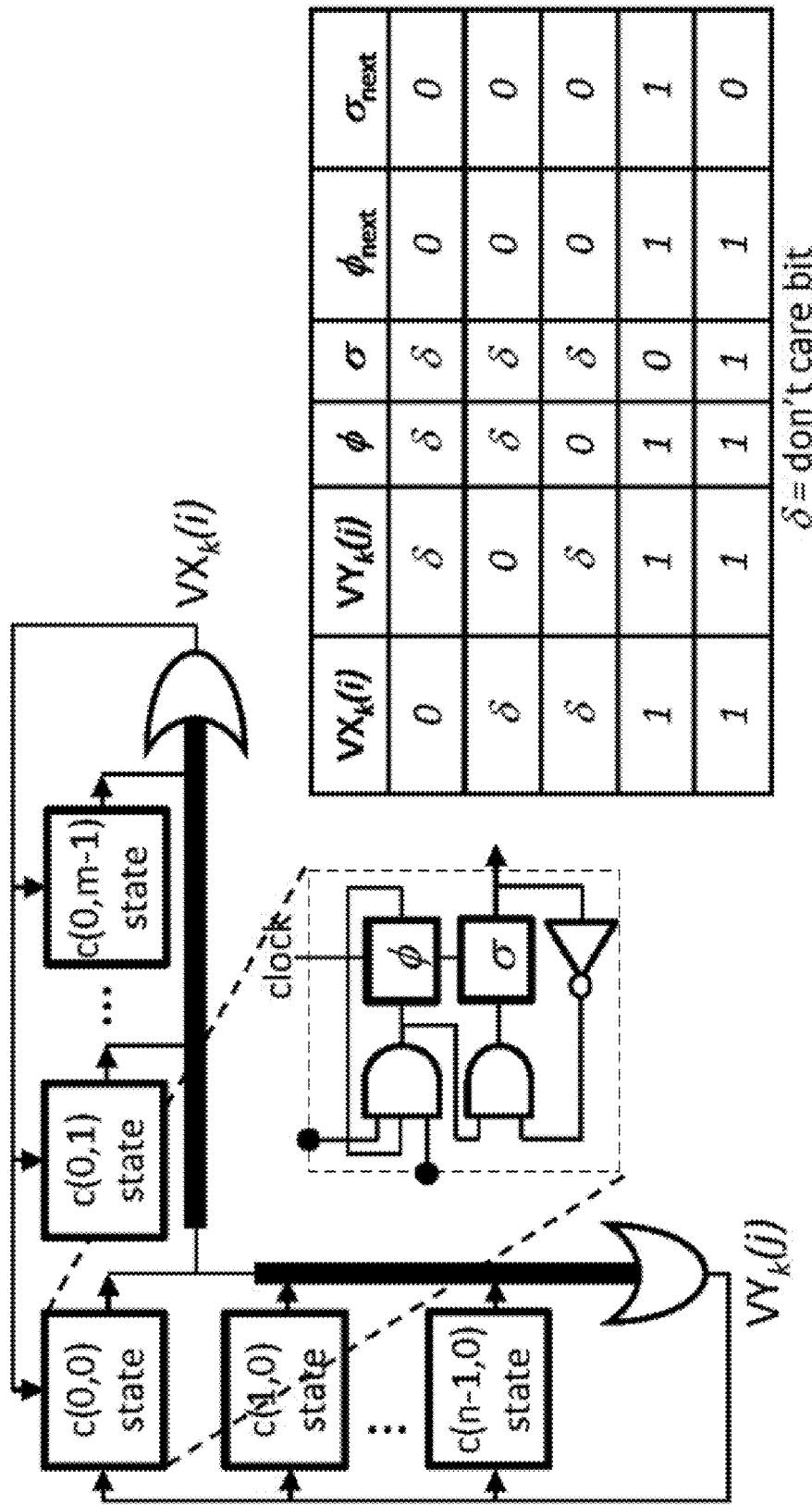
FIG. 6 illustrates one example logic-level hardware implementation of a component that can compute auxiliary information associated with RDIS.
Figure 7:
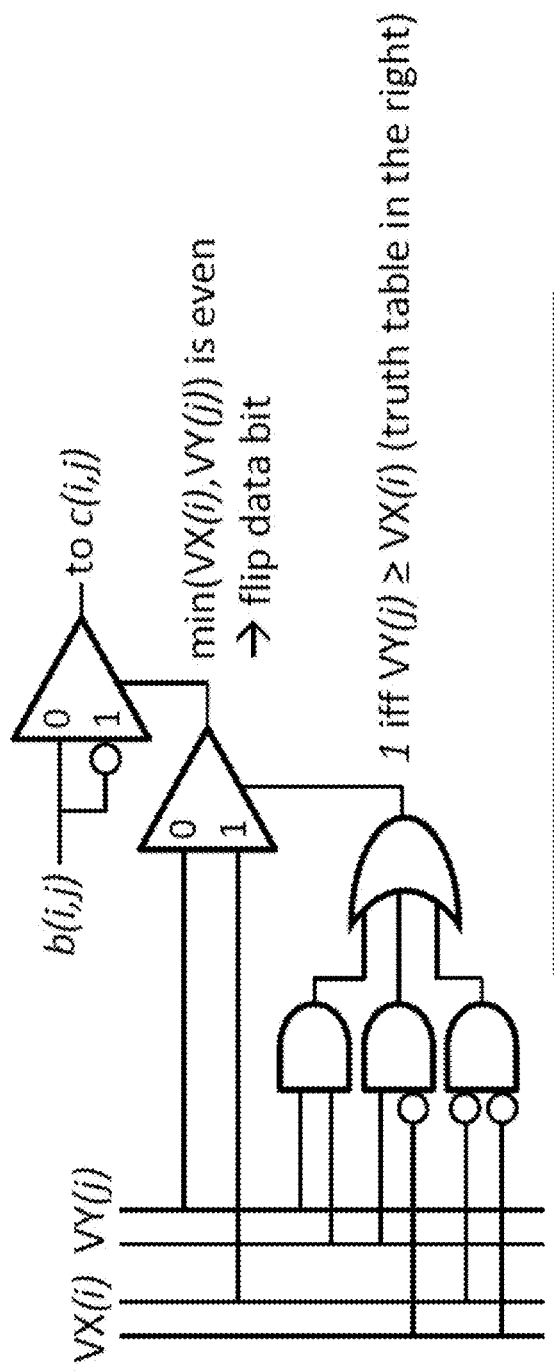
FIG. 7 illustrates one example logic-level hardware implementation of a modified write path associated with RDIS with three iterations (RDIS-3).

FIG. 5 illustrates an example hardware implementation of a system 500 employing RDIS. A conventional memory chip can include main storage 502, data buffer 504, and write/read hardware 506. System 500 can also comprise components to compute auxiliary information 508 (VX and VY) and store auxiliary information 510 based on fault information 512 and designation of the NF, SA-W, and SA-R cells 514 (e.g., via computation of the bits $\phi(i, j)$ and $\sigma(i, j)$). It can also include modified write/read hardware, as described herein. FIG. 6 illustrates one example logic-level hardware implementation of a component that can compute auxiliary information associated with RDIS, such as that of algorithm 1, along with an associated truth table. FIG. 7 illustrates one example logic-level hardware implementation of a modified write path associated with RDIS when K=3, such as that of algorithm 2, along with an associated truth table. Although specific hardware implementations are shown in FIGS. 6 and 7, these implementations are provided as examples for ease of illustration and discussion, and are not intended to be limiting, as multiple alternative implementations can be provided, and these alternatives are intended to be within the scope of the subject innovation.

The example implementation shown in FIG. 6 spends K cycles to compute VX and VY and maintains two single-bit registers $\phi$ and $\sigma$. These registers can be arranged (logically) into a two-dimensional array that can mimic the array of storage cells. In each cycle, a global OR operation in each row i can compute $VX_k(i)$ and a global OR operation in each column j can compute $VY_k(j)$. The value of $VX_k(i)$ can then be distributed to each cell in row i and the value of $VY_k(j)$ can be distributed to each cell in column j. A local circuit (also illustrated with a truth table) can then update the values of the registers $\phi$ and $\sigma$. To compute VX(i) and VY(j), a counter can be added to each row, i, and each column j (not shown). The signal $VX_k(j)$ can be used to increment the counter VX(i) and the signal $VY_k(j)$ can be used to increment the counter VY(j). Finally, the logic design (also in a truth table) of FIG. 7 can use the VX(i) and VY(j) counter values to determine whether or not to invert a particular user data bit b(i, j) before it is sent to c(i, j).

The example hardware implementations shown in FIGS. 6 and 7 infers that the major complexity lies on the write path as the RDIS technique is employed to compute the invertible set.

The read path can be augmented with a simple decoding logic. A recent PCM prototype has a relatively sparse pipeline stages that can easily incorporate the required logic. Write data are typically buffered before being written to the memory cells in an iterative manner. Hence, the computation of the invertible set can be done while the data is buffered and is off the critical write path.

As described above, RDIS techniques depend on the knowledge of the fault information (location and stuck-at value). While a read-after-write operation can discover all SA-W cells, it cannot distinguish between the NF and SA-R cells. However, the latter information can be obtained by testing storage cells on the intersection of a row and column both containing a SA-W cell. For example, to test a cell c(i, j), the value, v, stored in that cell can first be read, then the complement of v can be written into the cell and the value can be read again. If the value read is not the complement of v, then the cell is SA-R. Otherwise, the cell is NF. One way of avoiding the overhead of error detection before each write operation is to keep a cache which contains information about the faults. In one conventional system, a 128K-entry cache was enough to capture most of the fault information in an 8 Gbit memory, and the same cache design can be used in RDIS techniques.

The following discussion explains the overall flow of execution that an RDIS technique can implement to detect and mask faults from a system level perspective. After writing a block of data, a read operation can be performed to verify if data was written correctly. In case the read verification step did not detect any error, then the write request completed successfully and no further action is required. RDIS is different in this regard to ECC where the auxiliary information is always computed irrespective of the presence of errors. As a matter of fact, RDIS is designed specifically to deal with stuck-at faults where errors are permanent once manifested. On the other hand, ECC is designed for a general fault model where latent errors are possible. Hence, RDIS exploits the characteristics of the stuck-at fault model and saves the overhead of computing the auxiliary information when not needed.

In the other case, where the read verification operation discovers errors, RDIS can initiate the computation of the auxiliary information, i.e., the invertible set. As described above, the read verification operation reveals only the SA-W cells. However, RDIS requires determination of SA-R cells as well. To this end, another write operation with the original data inverted can be performed only to the cells that happen to be on the intersection of a row and column both containing a SA-W cell. Subsequently, a read verification operation can be executed on those same cells. If errors are manifested, then the cells that manifested those errors are SA-R since the errors appeared after inverting the data.

As explained, RDIS requires an extra write operation to reveal the fault information. This write operation could have a detrimental effect as it exacerbates the wearing of non-faulty cells. However, a non-faulty cell on the intersection of a row and column both containing stuck-at cells will be written only if SA-W cells happen to be in both row and column. Thus, non-faulty cells will not get written twice on every write request, due to the data-dependent nature of errors. Results discussed below quantify the effect of the extra write on the lifetime of a memory device.

Once the fault information is collected, the computation of the invertible set can be initiated, such as via example algorithms 1 and 2, and discussed in connection with FIGS. 6 and 7. The computation of the invertible set can conclude with setting the auxiliary counters with the appropriate values.

Clearly, the auxiliary counters are subject to wear-out if stored in the same medium (e.g., PCM, etc.). To counter this issue, two approaches could be followed. The first would be to store the counters off the chip in a stuck-at fault free medium such as DRAM. The second would be to protect the counters through a dedicated error correction scheme. As a matter of fact, the auxiliary counters are written at a lower rate than the actual data cells. Specifically, none of the auxiliary counters starts to be written before the first stuck-at fault appear in the protected block. In addition, writing the counters depends whether the row or the column they are associated with exhibits SA-W cells. Therefore, the setting of the counters is data-dependent. This said, protecting the auxiliary counters with an error correction scheme that has a mediocre capability and complexity should be good enough as the raw endurance of the counters should sustain their infrequent writes. As shown below, RDIS is capable of tolerating a significantly large number of stuck-at faults and the case of protecting the auxiliary counters with an error correction scheme is discussed.

Finally, certain memory blocks may have to be "retired" if they are no longer reliably written. The common practice is to retire the memory page in which the block resides. Free-p proposed retiring at the finer granularity of a block through block sparing. The assignment of spares in Free-p is static. A more recent block retirement technique for memories exhibiting the stuck-at fault model has been proposed to assign block spares dynamically. As discussed herein, RDIS techniques can be coupled with this block retirement technique, and results associated with such a combination are discussed herein.

There are only two specific conditions under which an RDIS technique fails to cover a given set of faults: (1) the progress stops because for some k, $C_k = C_{k-1}$; or (2) the capacities of the counters VX and VY are exceeded before the recursion terminates. Each of these two situations is caused by specific fault patterns described below, and can be addressed by techniques also discussed below.

In the first case, the progress of the construction of the invertible set stops because $C_k = C_{k-1}$ for some k. This situation relates to the following concepts.

A faulty cell, $c(i, j)$ in $C_k$ is referred to herein as row and column connected (RC-connected) if row i in $C_k$ contains at least one other faulty cell, $c(i, j_0)$, $j \neq j_0$ and column j in $C_k$ contains at least one other faulty cell $c(i_0; j)$, $i \neq i_0$. For example, cells $c(7, 3)$ in the array of 402 is RC-connected while cell $c(0, 2)$ is not RC-connected.

As used herein, a loop of faulty cells (or "loop of faults") is a sequence of 2q faults (q>1) where every two consecutive faults in the sequence are, alternatively, in the same row or in the same column. More specifically, a loop of faulty cells is of the form $c(i_1, j_1)$, $c(i_2, j_1)$, $c(i_2, j_2)$, $c(i_q, j_2)$, ..., $c(i_q, j_q)$, $c(i_1, j_q)$.

Definition. A loop of faults $c(i_1, j_1)$, $c(i_2, j_1)$, $c(i_2, j_2)$, $c(i_3, j_2)$, ..., $c(i_q, j_q)$, $c(i_1, j_q)$ is alternatively-stuck (or "A-stuck") if the faults in the loop alternate between SAR and SA-W. That is, faulty cells $c(i_1, j_1)$, $c(i_2, j_2)$, ..., $c(i_q, j_q)$, are stuck at a value, while faulty cells $c(i_2, j_1)$, $c(i_3, j_2)$, ..., $c(i_1, j_q)$, are stuck at the opposite value.

Figure 8:
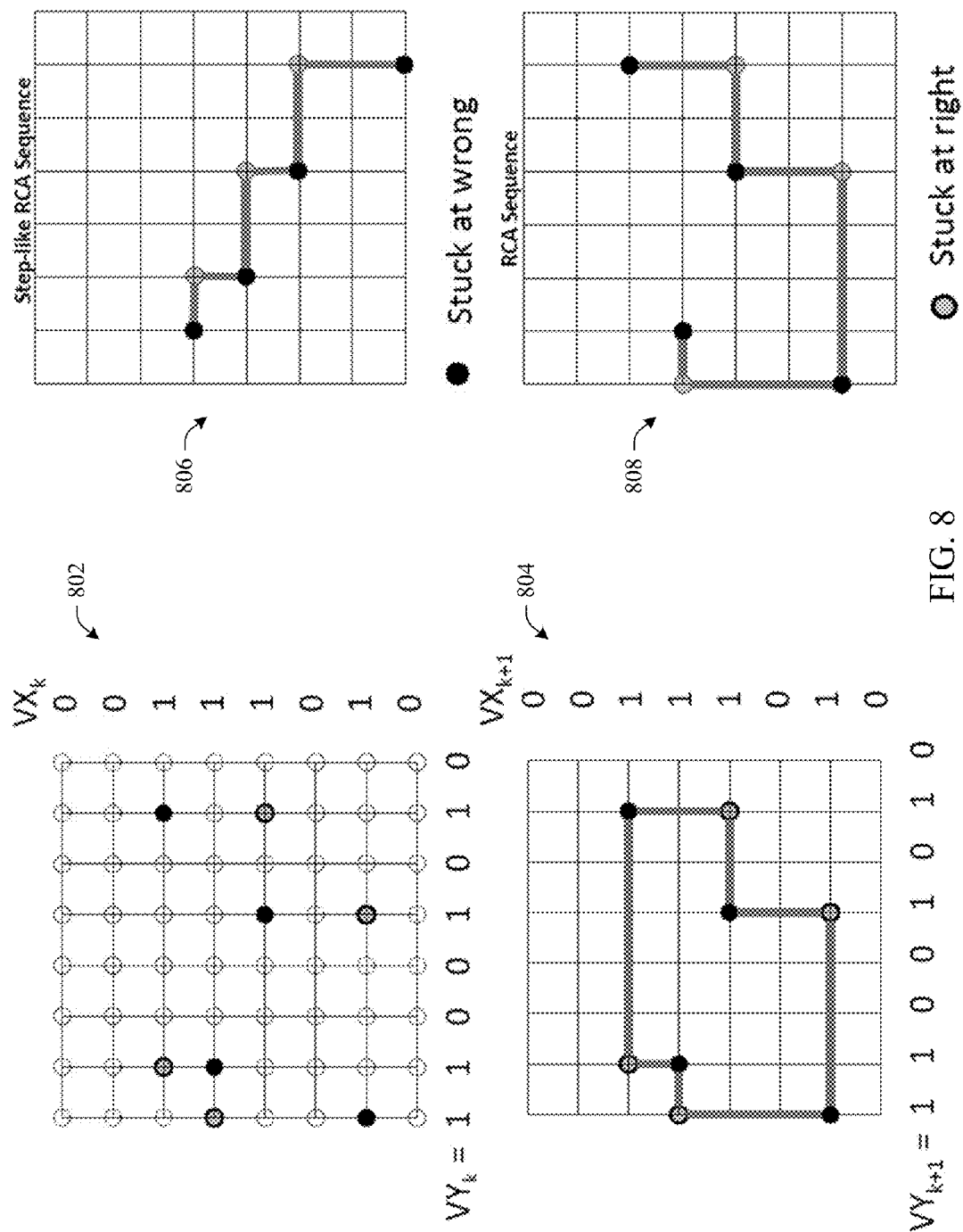
FIG. 8 illustrates a loop of faults that cannot be masked via RDIS and a row-column alternating sequence that cannot be masked in three iterations via RDIS.

FIG. 8 illustrates a loop of faults that cannot be masked at 802 and 804, as well as a pair of row-column alternating sequences (discussed below) that cannot be masked in three iterations at 806 and 808. For example, the loop in 802 and 804 includes the sequence of faulty cells $c(2, 6)$, $c(4, 6)$, $c(4, 4)$, $c(6, 4)$, $c(6, 0)$, $c(3, 0)$, $c(3, 1)$, $c(2, 1)$. Moreover, this loop is A-stuck since cells $c(2, 6)$, $c(4, 4)$, $c(6, 0)$, $c(3, 1)$ are SA-W, while cells $c(4, 6)$, $c(6, 4)$, $c(3, 0)$, $c(2, 1)$ are SA-R.

It can be shown that the process of constructing the invertible set stops with $C_k = C_{k-1}$ for some k, if the original array of cells, C, contains a loop of faults that is A-stuck. This can be seen by assuming that C contains the A-stuck loop of faults, $c(i_1, j_1)$, $c(i_2, j_1)$, $c(i_2, j_2)$, $c(i_3, j_2)$, ..., $c(i_q, j_q)$, $c(i_1, j_q)$. By definition, each of rows $i_1, i_2, \ldots, i_q$ contains two faults, one SA-R and one SA-W, and each of columns $j_1, j_2, \ldots, j_q$ contains two faults, one SA-R and one SA-W. Hence, $C_1$ will include rows $i_1, i_2, \ldots, j_q$ and columns $j_1, j_2, \ldots, j_q$, meaning that it will include the loop of faults. Similarly, $C_2$ and any subsequent subarray will include the same loop of faults. Given that the number of faulty cells in C is finite, then the construction of $C_k \subset C_{k-1}$ will eventually terminate with $C_k = C_{k-1}$ for some k.

In contrast, the process of constructing the invertible set terminates with $C_K$ being empty for some K if the original array of cells, C, does not contain a loop of faults. This can be seen by first observing that if k is odd (a similar argument applies if k is even) and array $C_k$ contains some faulty cells but does not contain a loop of faults, then at least one of the faulty cells in $C_k$, say $c(i, j)$, is not RC-connected. Second, if $c(i, j)$ is SA-R, then during the construction of $C_{k+1}$, either $VX_{k+1}(i)=0$ or $VY_{k+1}(j)=0$. This is because either row i does not have a faulty cell besides $c(i, j)$ or column j does not have a faulty cell besides $c(i, j)$. This leads to the exclusion of $c(i, j)$ from $C_{k+1}$. If, on the other hand, $c(i, j)$ is SA-W then it will be included in $C_{k+1}$ but will lead to $VX_{k+2}(i)=0$ or $VY_{k+2}(j)=0$ and thus excluded from $C_{k+2}$. That is, $C_{k+2}$ is a strict subset of $C_k$. Moreover, given that $C_k$ does not contain a loop of faults, then $C_{k+2}$ does not contain a loop of faults either and the process of excluding faults from consecutive subarray continues until an empty CK is reached.

Although the process of constructing the invertible set eventually terminates successfully if the fault pattern does not include a loop of faults. However, even in the absence of a loop of faults, the process of constructing the invertible set may fail because of the limited capacity of the counters VX and VY. Specifically, if the maximum capacity of the counters is K and $C_K$ contains both SA-W and SA-R cells, then the construction of the invertible set will fail. The fault configuration that leads to this failure is discussed below.

As used herein, a row-column alternating sequence ("RCA sequence") of 2q−1 faulty cells (q>1) is a loop of 2q faulty cells after excluding one node. This definition implies that every two consecutive faults in an RCA sequence are, alternatively, in the same row or in the same column. If the two first cells in the sequence are in the same column, then the sequence is of the form $c(i_1, j_1)$, $c(i_2, j_1)$, $c(i_2, j_2)$, $c(i_3, j_2)$, ..., $c(i_q, j_{q-1})$, $c(i_q, j_q)$, while if the first two cells are in the same row, the sequence is of the form $c(i_1, j_1)$, $c(i_1, j_2)$, $c(i_2, j_2)$, $c(i_2, j_3)$, ..., $c(i_q, j_{q-1})$, $c(i_q, j_q)$.

An RCA sequence (of either form) of 2q−1 faulty cells, $c_1$, $c_2$, ..., $c_{2q-1}$ is referred to herein as alternatively-stuck (or "A-stuck") if the first fault in the sequence is SA-W and subsequent faults alternate between SA-R and SA-W. That is, cells $c_1, c_3, \ldots, c_{2q-1}$ are SA-W, while cells $c_2, c_4, \ldots, c_{2q-2}$ are SA-R.

For example, image 806 shows an RCA sequence of 7 faults which is obtained by removing cell $c(2, 1)$ from the loop of faults shown in 802 and 804. This RCA sequence is A-stuck. The step-like RCA sequence in 808 is isomorphic to the RCA sequence in 806, and can be obtained by interchanging columns 0 and 2, rows 4 and 5, rows 4 and 6 and rows 2 and 7. The following theoretical results related to RCA sequences are more intuitive if RCA sequences are envisioned as step-like. In general, any RCA sequence can be transformed to a step-like one by a series of row/column interchanges.

The first result related to RCA sequences is that the process of constructing the invertible set fails to terminate after K iterations (with $C_K$ containing only SA-R cells or only SA-W cells) if the original array of cells, C, contains an RCA sequence of at least 2K+1 faults and this sequence is A-stuck. This can be seen by assuming that C contains an RCA sequence $c_1, c_2, \ldots, c_{2q+1}$ which is A-stuck. By construction, $C_1$ contains all the cells in that sequence. However, consider any of the cells $c_i$, where i=2, . . . , 2q. If cell $c_i$ is SA-R, then it is located in a row that contains a SA-W cell and in a column that contains a SA-W cell. Hence, this cell will be included in the subarray $C_2$. A similar argument applies if $c_i$ is SA-W and consequently $C_2$ will contain the RCA sequence $c_2, c_3, c_{2q}$. Applying this argument recursively leads to the conclusion that if q≥K, then the subarray $C_K$ will contain the RCA sequence $c_K, \ldots, c_{2q+1-(K-1)}$. In other words, if the RCA sequence contains at least 2K+1 cells, then $C_K$ will contain at least the three cells $c_K$, $c_{K+1}$ and $C_{K+2}$. Being three consecutive cells in an RCA sequence, at least one of the cells is SA-R and another is SA-W, therefore the process will not have terminated after K steps.

On the other hand, the invertible set can be constructed in at most K iterations if the longest RCA sequence of faults in the original array of cells, C, contains at most 2K−1 faults. This can be seen via proof by induction. Specifically, the following three results establish the proof, with the first establishing the base of the induction, and the other two dealing with the induction steps. These results are based on the observation that the first and last cells in an RCA sequence are not RC-connected.

First, if the longest RCA sequence in C is $c_1, c_2, \ldots, c_q$, then the longest RCA sequence in $C_1$ is $c_{1+u}, \ldots, c_{q-v}$, where u, v≥0 and both $c_{1+u}$ and $c_{q-v}$ are SA-W. This is because, by construction, any faulty cell that is not RC-connected in $C_1$ should be SA-W.

Second, for k=1, 3, . . . , if the longest RCA sequence in $C_k$ is $c_1, c_2, \ldots, c_q$, where $c_1$ and $c_q$ are SA-W, then the longest RCA sequence in $C_{k+1}$ is $c_{1+u}, \ldots, c_{q-v}$, where u, v>0 and both $c_{i+u}$ and $c_{q-v}$ are SA-R. This is because, by construction, any faulty cell in $C_{k+1}$ that is not RC-connected should be SA-R.

Third, for k=2, 4, . . . , if the longest RCA sequence in $C_k$ is $c_1, c_2, \ldots, c_q$ where $c_1$ and $c_q$ are SA-R, then the longest RCA sequence in $C_{k+1}$ is $c_{1+u}, \ldots, c_{q-v}$, where u, v>0 and both $c_{1+u}$ and $c_{q-v}$ are SA-W. This is because, by construction, any faulty cell that is not RC-connected in $C_{k+1}$ should be SA-W.

The above three results prove that for k=1, 2, . . . , if the longest RCA sequence in $C_k$ includes q cells, then the longest RCA sequence in $C_{k+1}$ includes q−2 cells. Therefore, if the longest RCA sequence in C has 2K−1 cells, then the longest RCA sequence in $C_K$ has one cell (SA-W if K is even and SA-R if K is odd). This proves that $C_K$ includes only one type of faulty cells (SA-R or SA-W).

Consider a storage block of n×m cells of which F cells are faulty and assume that an RDIS technique is used for masking the faults with the maximum counter capacity of K. The above results identify the only two types of fault patterns that can cause the failure of the RDIS technique to mask the faults: loops of faults and RCA sequences of length 2K+1. As used herein, a block of cells is called defective if it contains a loop of faults or an RCA sequence of at least 2K+1 faults.

If a block of cells with F faults is not defective, then it can be used to write/read any combination of information bits. For a small number of faults, it is possible to compute the probability of having a defective block analytically. For example, three faults cannot form a loop of faults. With four faults, the probability of having a loop of faults in an n×m block is given by $$\binom{n}{2}\binom{m}{2}\bigg/\binom{n \cdot m}{4}.$$

Applying this formula, the probability of having a defective fault pattern given four faults is 0.0012 when n=m=8 and 0.00008 when n=m=16. The following gives a detailed evaluation of the probability of a block being defective in the presence of F faults.

As discussed above, a loop of faults or an RCA sequence of faults are the only patterns that can cause RDIS to halt. Techniques are disclosed herein that can be employed by systems and methods of the subject innovation to recover from defective patterns. The first category of techniques encompasses techniques that can fix a defective block through breaking loops of faults or RCA sequences. The second category of techniques encompasses techniques that can extract additional lifetime from defective blocks through usage of block sparing.

Figure 9:
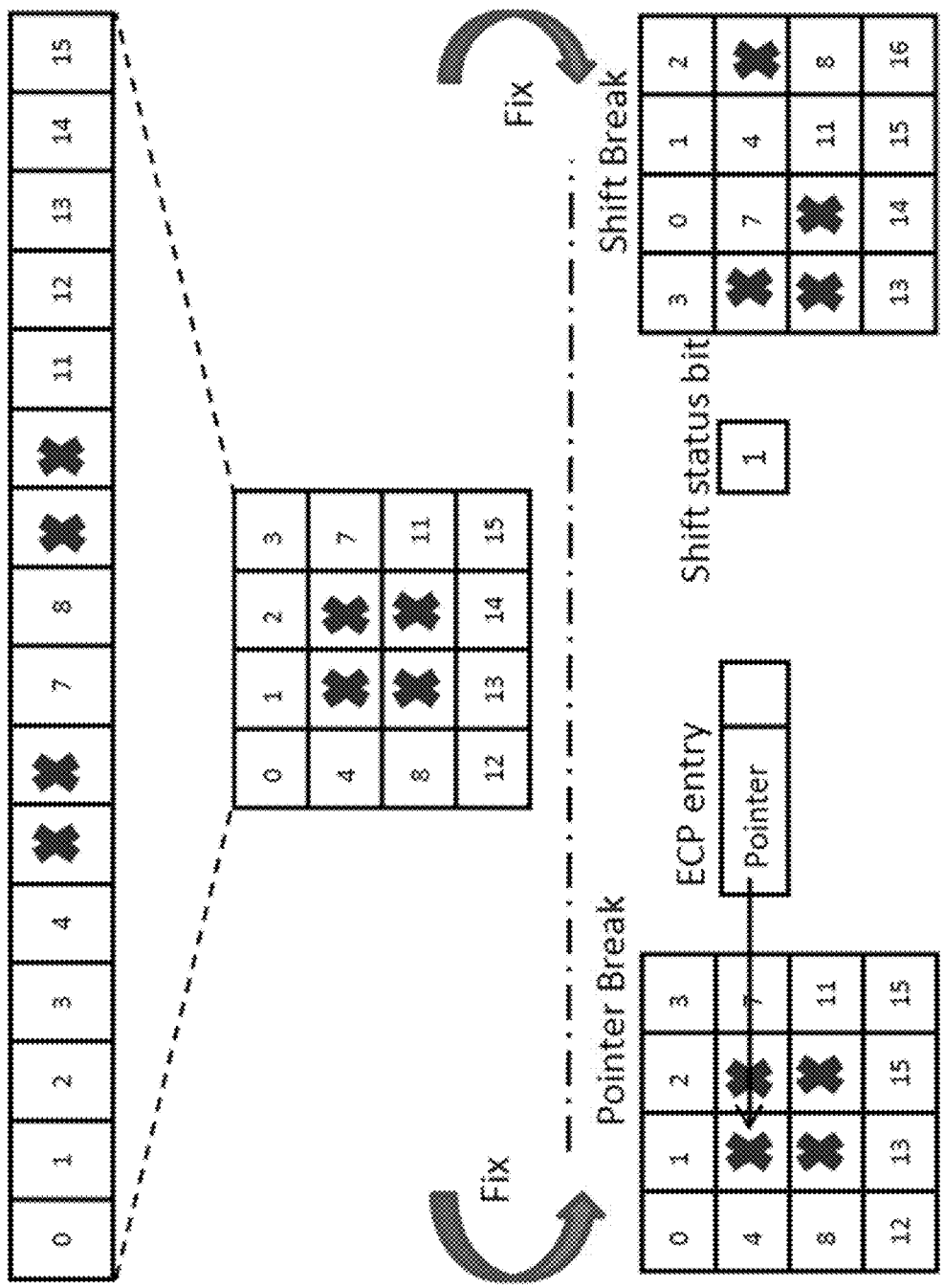
FIG. 9 illustrates two techniques of addressing defective blocks in accordance with aspects of the subject innovation.

FIG. 9 illustrates two techniques of addressing defective blocks in accordance with aspects of the subject innovation. These two techniques can be used to recover from the detrimental effect of RCA sequences and loops of faults. The first technique is referred to herein as pointer break, and consists of allocating a pointer with a replacement cell to be used to break a loop of faults or an RCA sequence of faults once manifested. The pointer specifies the location of a stuck-at cell to be replaced by the replacement cell. Choosing any faulty cell in an RCA sequence or loop of faults is enough to break the deadlock. However, picking the middle cell can be advantageous as it reduces the probability of forming a new RCA sequence. As a matter of fact, half the total number of faults in the original defective pattern is required for an RCA sequence to form.

The second technique is referred to herein as shift break, and consists of changing the mapping of the cells into the logical 2D n×m structure. One possible implementation would be to shift the position of a cell by its row number modulo m. Though shifting the cells in the block is not masking any of the stuck-at faults, it is likely to cause the faulty cells to form a pattern that does not result in a defective block, and can be addressed via RDIS techniques discussed herein.

Pointer break and shift break techniques are complementary to one another, and various embodiments can employ either or both techniques. The pointer break technique guarantees the breaking of a defective pattern. On the other hand, the shift break cannot guarantee the recovery from a defective pattern as the existing faulty cells in the protected block could form a new defective pattern. Nevertheless, the likelihood of this event is low.

From an implementation point of view, shift break is a simple technique to implement. It requires a simple remapping function and one additional auxiliary bit that serves as a flag to indicate whether a shift is applied. On the other hand, pointer break is more complex to implement. It requires log (n×m)+1 auxiliary bits. In addition, it requires determining the location of the stuck at cells that form the defective pattern in order to pick one cell to break the pattern. Results discussed herein evaluate both techniques.

Figure 10:
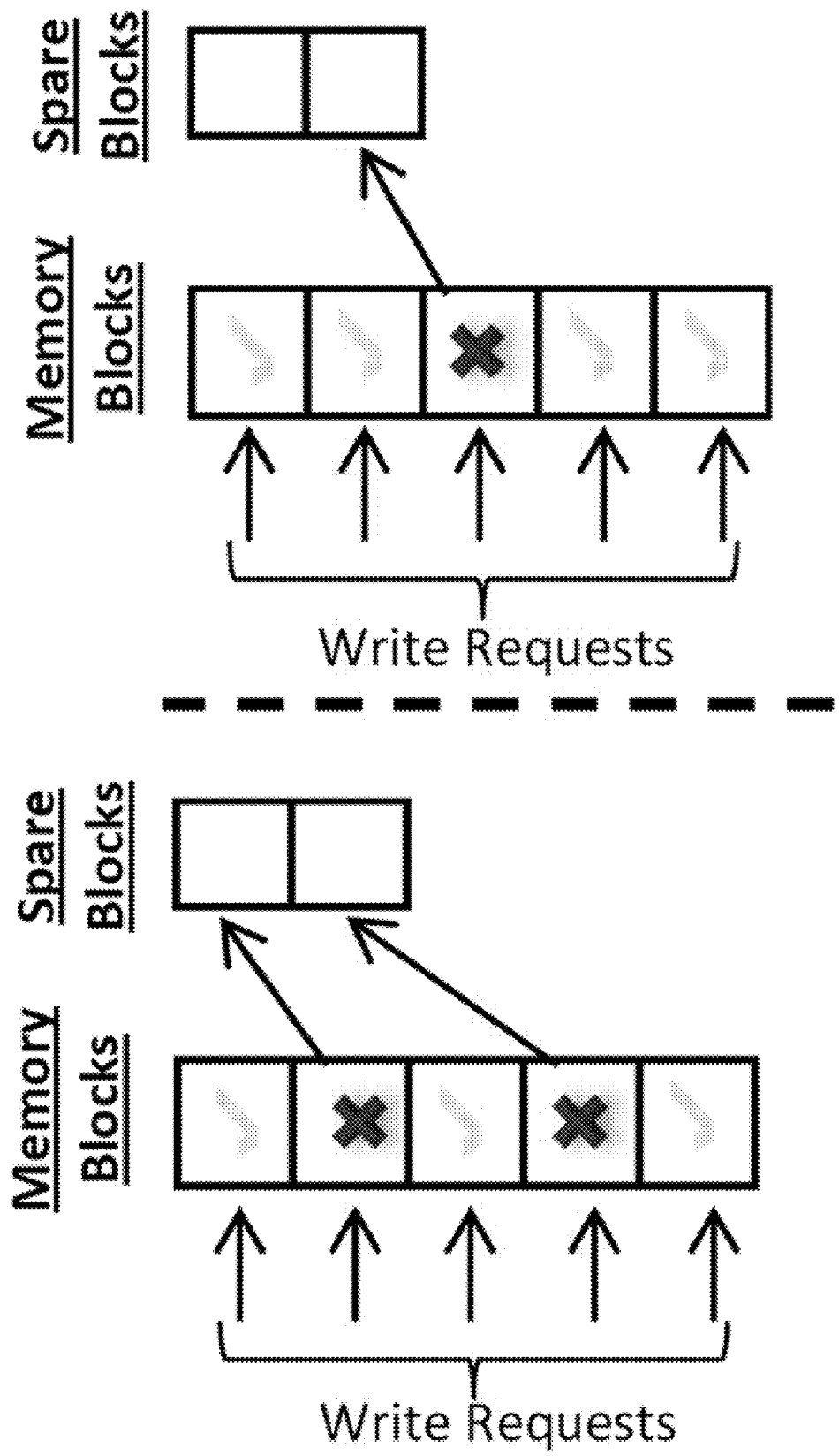
FIG. 10 illustrates the concept of data dependent-sparing.

After a faults pattern fails to be masked by the deployed error correction scheme within a memory block, the common practice is to map-out the memory page where the block resides from the address space. The Free-p technique proposed a graceful degradation of memory space through sparing. When a memory block suffers from an uncorrectable faults pattern, a pointer is embedded to permanently remap the defective block into a fault free spare block. Recently, Data-dependent sparing has been proposed. The data-dependent technique builds on the fact that failures are data-dependent within the context of the stuck-at fault model. Thus, a defective block fails occasionally with specific write patterns. This said, data-dependent sparing proposed to assign spares temporally and dynamically after a write failure to a defective block. A later write request to the same block is attempted locally and is likely to be successful. FIG. 10 illustrates the concept of data dependent-sparing.

As shown above, it is not enough for the faults to form a loop of faults or an RCA sequence for the RDIS technique to halt. Additionally, the loop of faults or RCA sequence must be alternatively stuck. Thus, failures of the RDIS technique are data dependent. Accordingly, coupling RDIS with the data-dependent sparing technique can be synergistic in extending the lifetime of a memory device, and the effects on lifetime are discussed below.

Monte Carlo simulations were employed to study the various parameters that affect an RDIS technique, as well as to compare it to other schemes. For purposes of the simulation, all cells within a storage block were assumed to have equal probability of failure. To test if a nxm storage block having F faulty cells is defective, the block was modeled as a bipartite graph of (n+m) nodes, one for each row and one for each column. If a cell c(i, j) was faulty, then an edge connected the nodes representing row i and column j. A simple variation of the depth first search algorithm (DFS) was used to detect the occurrence of a loop. To detect RCA sequences, the longest recursion depth executed by DFS while attempting to detect a loop was monitored. In other words, the algorithm either detected the existence of a loop, if any, or returned the length of the longest RCA sequence.

Stuck-at faults have been shown to be the dominating failure source in PCM. Disturbance and resistance drift failures are prominent in multi-level PCM not targeted by RDIS. Accordingly, only stuck-at faults were simulated.

The block size to be protected and the overhead of auxiliary counters are the main parameters that affect RDIS techniques. Accordingly, the performance of RDIS in light of these parameters was studied. RDIS was simulated with 5 different block sizes of varying overhead. In addition, each block size was simulated with three variations of RDIS techniques. The first variation limited the capacity of the auxiliary counters to 3, the second to 7 and the last to the number required to tolerate the maximum possible RCA sequence. For ease of reference, these three variations are denoted, respectively, as RDIS-3, RDIS-7 and RDIS-max.

For each block size, the study determined the average number of faults that can be tolerated as well as the probability of failure with F faults for F=1, 2, .... Given a block of size nxm, the corresponding overhead is (n·s+m·s)/(n·m), where s is the size of each auxiliary counter in bits. For example, a 128-byte data block arranged as a 32×32 bit array incurs a 12.5% overhead for s=2. It is to be noted that for a fixed s, the overhead percentage decreases with the increase in the size of the protected storage block.

Figure 11:
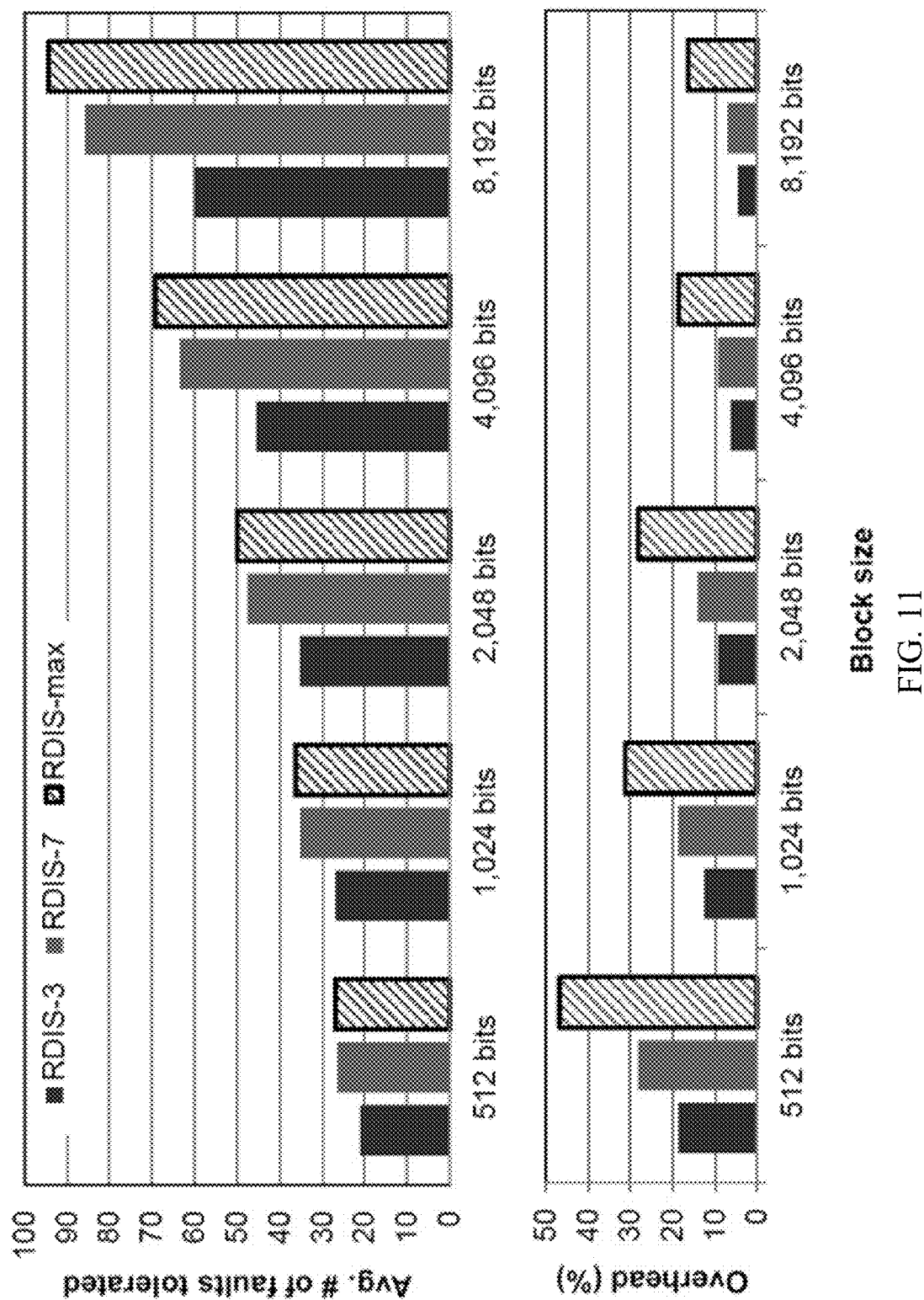
FIG. 11 illustrates the average number of faults that can be tolerated for various block sizes and the overhead of the three RDIS configurations that were studied.

FIG. 11 illustrates the average number of faults that can be tolerated for various block sizes and the overhead of the three RDIS configurations that were studied. The overhead for RDIS-max was calculated based on the maximum length of an RCA sequence that can occur within a block. Specifically, for an nxm block, the maximum length of an RCA sequence is n+m−1 (this can be seen by considering a step-like RCA sequence starting at c(0; 0) and ending at c(n−1, m−1)), and thus a counter of size $s=\lceil \log_2((n+m-1)/2) \rceil$ bits would be sufficient for recovery according to results discussed above. From the results shown in FIG. 11, it can be inferred that the average number of faults tolerated within each block increases with the overhead. Hence, the choice of auxiliary counters capacity for RDIS represents a trade-off between the number of faults that can be tolerated and the overhead, and different embodiments of the subject innovation can employ different auxiliary counter capacities. Of the three configurations considered, RDIS-3 was shown to correct many errors robustly at the smallest overhead.

Figure 12:
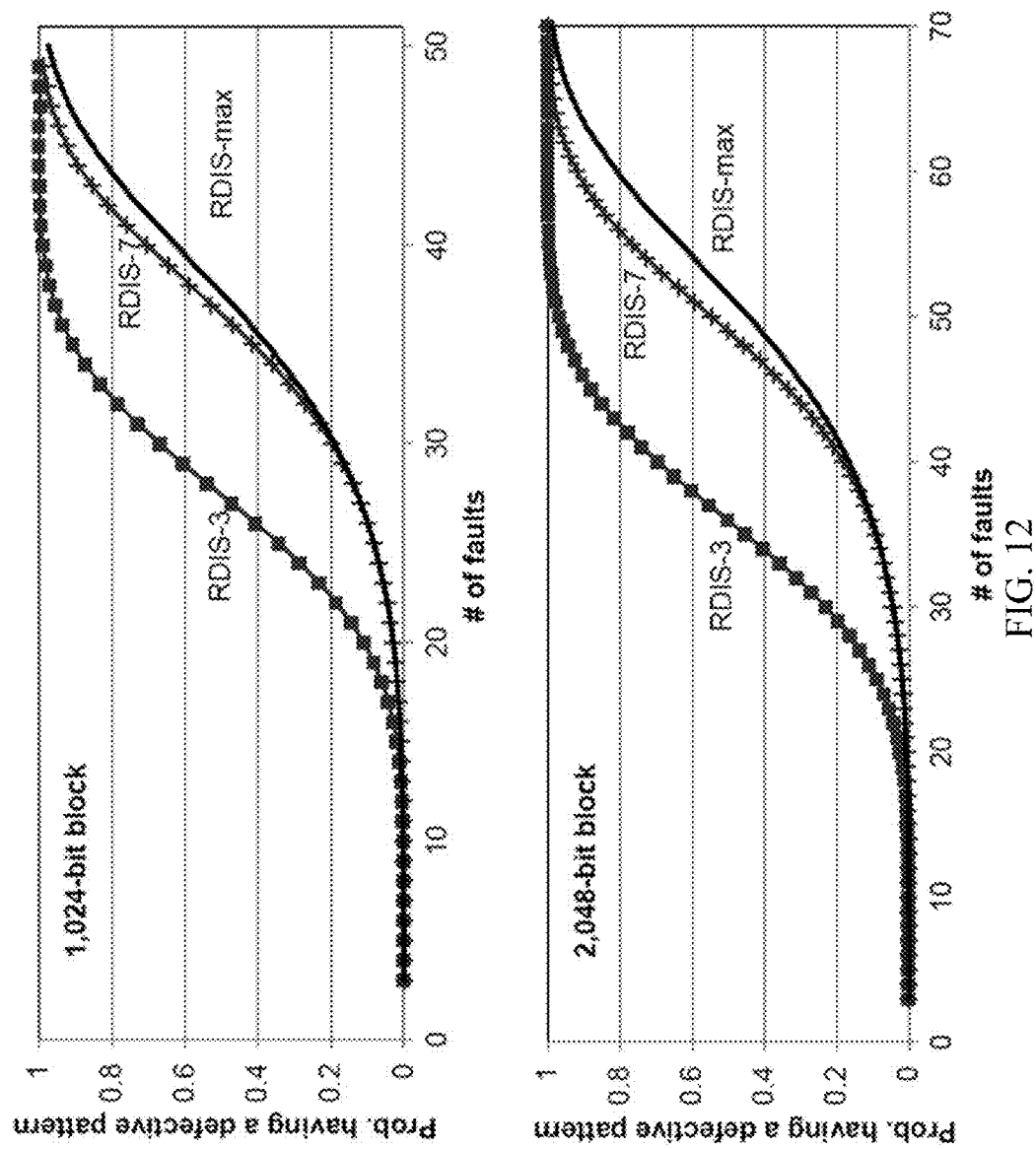
FIG. 12 illustrates the probability of a defective pattern based on the number of faults for the three studied RDIS configurations at two different block sizes.

One significant advantage of RDIS over conventional techniques is the large probability to tolerate a relatively large number of faults. FIG. 12 illustrates the probability of a defective pattern based on the number of faults for the three studied RDIS configurations at two different block sizes. As can be seen in FIG. 12, given F faults, the probability of forming a loop or RCA sequence increases at low pace with the increase of F. Accordingly, RDIS is capable of tolerating a high number of faults beyond what it guarantees. Although FIG. 12 only shows the results for blocks of 1,024 bits and 2,048 bits, other block sizes exhibit the same trend and are omitted for brevity. These results show that RDIS-3 is capable of tolerating a notable number of faults while incurring an affordable overhead. As a matter of fact, the relative increase in the number of faults tolerated by increasing the counters capacity beyond three is not proportional to the increase in the overhead. Because of these features of RDIS-3 and for ease of reference, only RDIS-3 is discussed in the following results.

Figure 13:
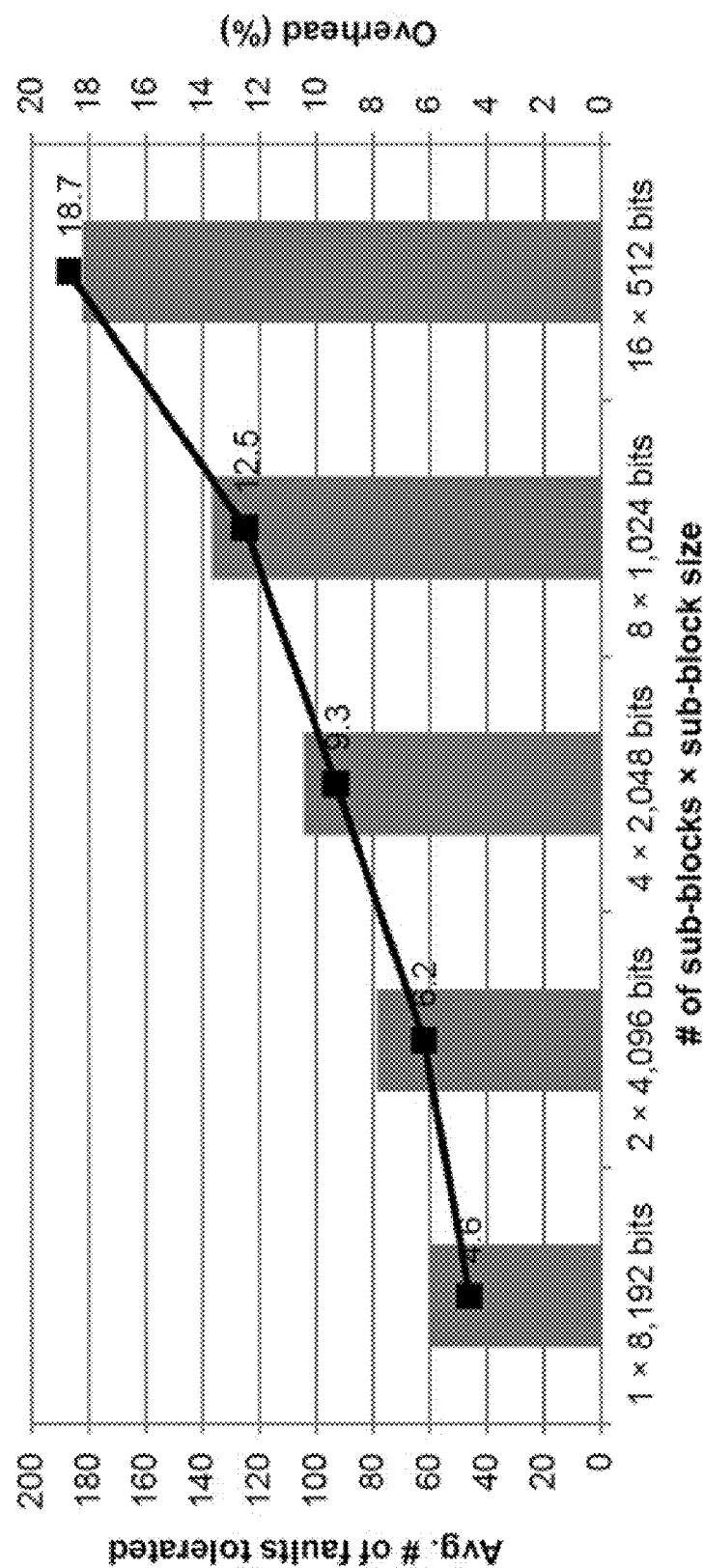
FIG. 13 illustrates the average number of tolerated faults in 1 KB of memory.

As discussed above, varying the capacity of the auxiliary counters is one way of affecting the trade-off between the number of faults tolerated and the overhead. Another way of affecting this trade-off is through protecting a memory block as a combination of smaller sub-blocks while fixing the counters capacity. FIG. 13 illustrates the average number of tolerated faults in 1 KB of memory. The block of 1 KB of memory was protected through dividing it into smaller sub-blocks, with each sub-block protected with RDIS-3. The 1 KB block was considered defective as soon as any of its sub-blocks became defective. Such an approach can lead to a significant increase in the average number of tolerated faults, as depicted in FIG. 13.

The performance of RDIS techniques were also evaluated against other schemes. Specifically, RDIS-3 was compared with SAFER, which has been shown to be superior to ECP and ECC. The overhead of SAFER depends on the number of groups that a block is partitioned into, and when used to protect a block of N bits using n groups, SAFER has an overhead of $(\lceil \log_2 n \rceil \times \lceil \log_2[\log_2 N] \rceil)+[(\log_2[\log_2 n]+1)]+n$. RDIS-3 was compared with two SAFER configurations, one that had an overhead just smaller than RDIS-3, and one with an overhead just larger than RDIS-3. Two metrics were used for comparison: (a) the probability of failure with F faults; and (b) the average number of faults that can be tolerated in a storage block.

Figure 14:
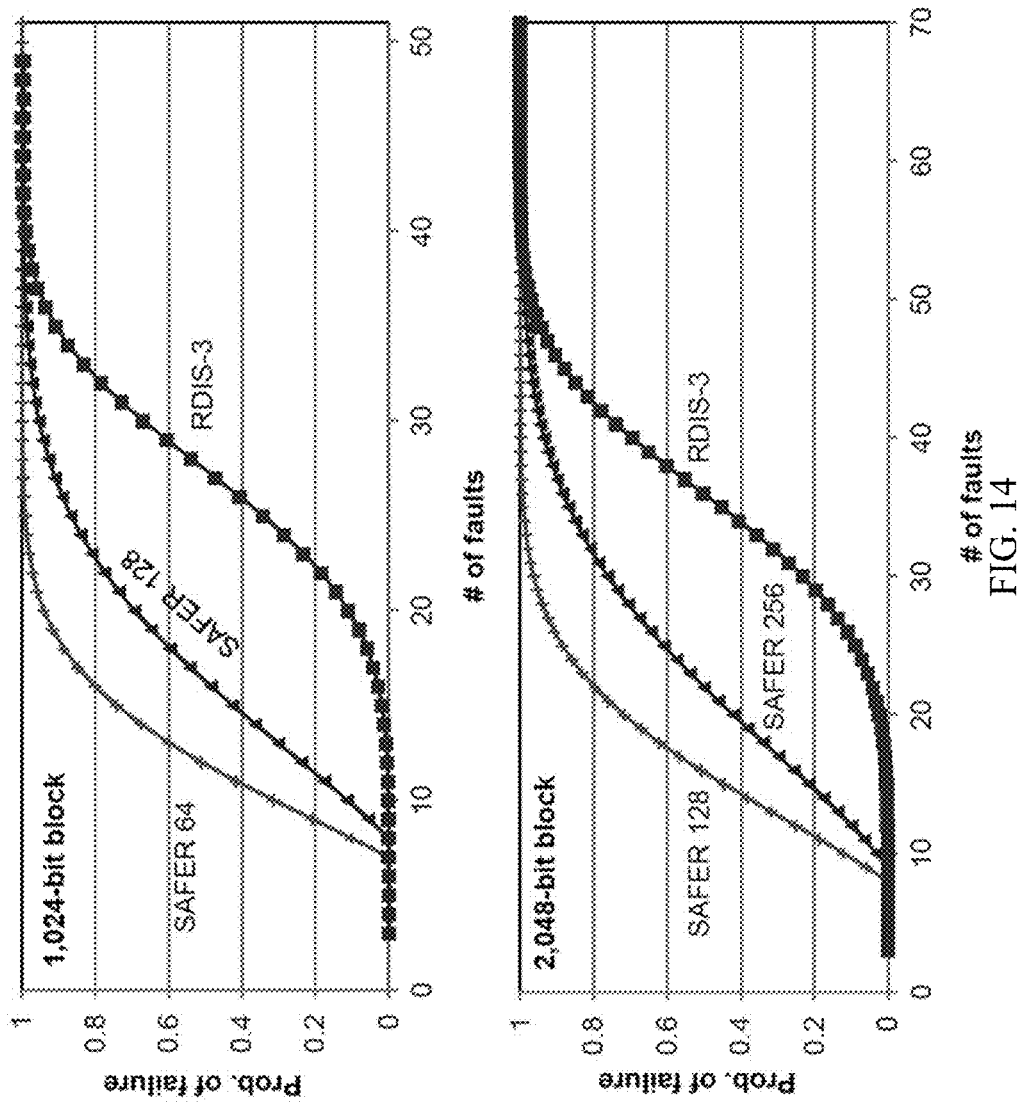
FIG. 14 illustrates the probability of failure of a storage block after F faults under RDIS-3 and two versions of SAFER.

Both RDIS and SAFER can probabilistically tolerate more faults than what they guarantee. With n groups, SAFER (referred to herein as SAFER n) guarantees the tolerance of $\log_2 n+1$ faults while RDIS can always tolerate three faults. Any additional fault was tolerated by both schemes with a certain probability. FIG. 14 illustrates the probability of failure of a storage block after F faults under RDIS-3 and two versions of SAFER. Though SAFER guarantees the tolerance of more faults than RDIS, the probability of failure after what it guarantees increases at a high rate. However, the probability of failure for RDIS increases at a substantially low rate. In addition, the probability of failure for RDIS in the interval of faults that SAFER guarantees is remarkably low as seen in Table 1, even when compared with the higher overhead version of SAFER:

TABLE 1

RDIS vs. SAFER: Probability of failure

| | 1 Kbits | | 2 Kbits | |
|---|---|---|---|---|
| # Faults | SAFER 128 | RDIS-3 | SAFER 256 | RDIS-3 |
| 4 | 0 | $6 \times 10^{-6}$ | 0 | $2 \times 10^{-6}$ |
| 5 | 0 | $3 \times 10^{-5}$ | 0 | $5 \times 10^{-6}$ |
| 6 | 0 | $8 \times 10^{-5}$ | 0 | $1 \times 10^{-5}$ |
| 7 | 0 | $2 \times 10^{-4}$ | 0 | $4 \times 10^{-5}$ |
| 8 | 0 | $4 \times 10^{-4}$ | 0 | $1 \times 10^{-4}$ |
| 9 | 0.055 | 0.0008 | 0 | $2 \times 10^{-4}$ |
| 10 | 0.11 | 0.0015 | 0.03 | 0.00033 |
| 11 | 0.17 | 0.0025 | 0.06 | 0.00057 |
| 12 | 0.23 | 0.0045 | 0.09 | 0.00093 |
| 13 | 0.30 | 0.0074 | 0.13 | 0.0015 |

Though Table 1 only shows the results for two different block sizes for brevity, the same trend is manifested with other block sizes.

Figure 15:
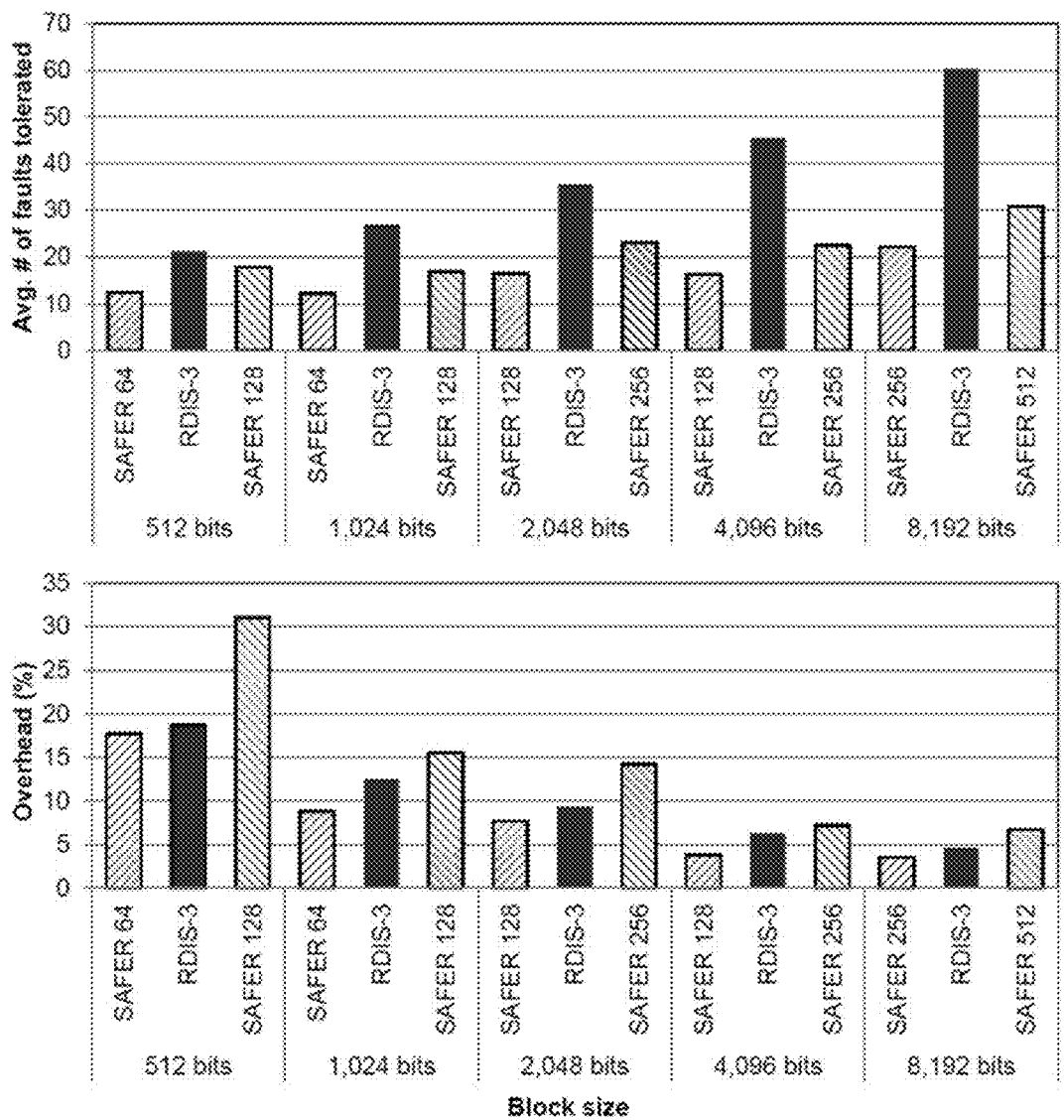
FIG. 15 illustrates the average number of faults that can be tolerated by RDIS-3 and various implementations of SAFER, along with the corresponding overhead.

FIG. 15 illustrates the average number of faults that can be tolerated by RDIS-3 and various implementations of SAFER, along with the corresponding overhead. The advantage of RDIS techniques over SAFER, when it comes to the low probability of failure, is manifested by the average number of faults that each scheme can tolerate as shown in FIG. 15. The results show a significant advantage for RDIS techniques over SAFER. For example, RDIS-3 is capable of tolerating 18% more faults than SAFER 128 with a 512-bit block size and 95% more faults than SAFER 512 with a 8,192-bit block. Note that this increase in the average number of faults tolerated is realized with lower overhead. The results herein demonstrate that RDIS is capable of tolerating a large number of faults on average and is characterized by a probability of failure that increases at a low rate with the increase in the number of faults. With a block size of at least 1,024 bits, the overhead of RDIS is within the 12.5% standard.

Similarly to SAFER, RDIS techniques cannot recover from faults in the auxiliary bits. Specifically, it is assumed that the storage of those bits is error free. The ECP scheme is different in that regard in the sense that it can protect the cells that replace faulty cells. In various embodiments, ECP can be used to protect the auxiliary counters of RDIS-3 against faults. For this, $\pi$ pointers can be allocated to protect the auxiliary bits. RDIS-3 was simulated with various values of $\pi$, indicating that $\pi=5$ was a suitable value since it maintains the high number of faults tolerated when counters are assumed to be fault-free. As used herein, RDIS-3PX refers to RDIS-3 combined with such techniques to protect the auxiliary bits of RDIS-3 (with similar terminology for other RDIS techniques (e.g., RDIS-7, etc.)).

Figure 16:
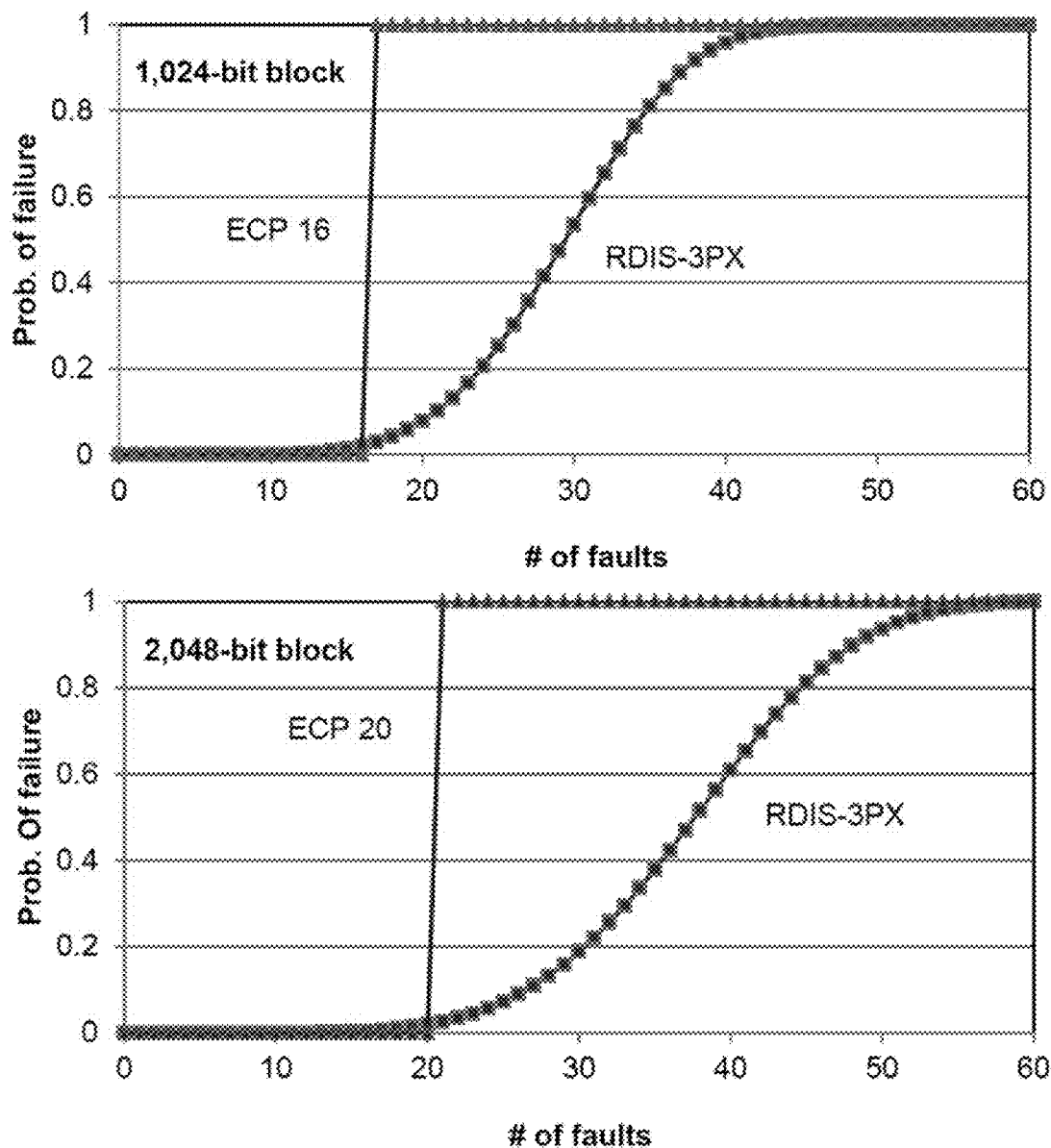
FIG. 16 illustrates the probability of failure of RDIS-3 with auxiliary information protection and an ECP embodiment with slightly larger overhead for different block sizes.
Figure 17:
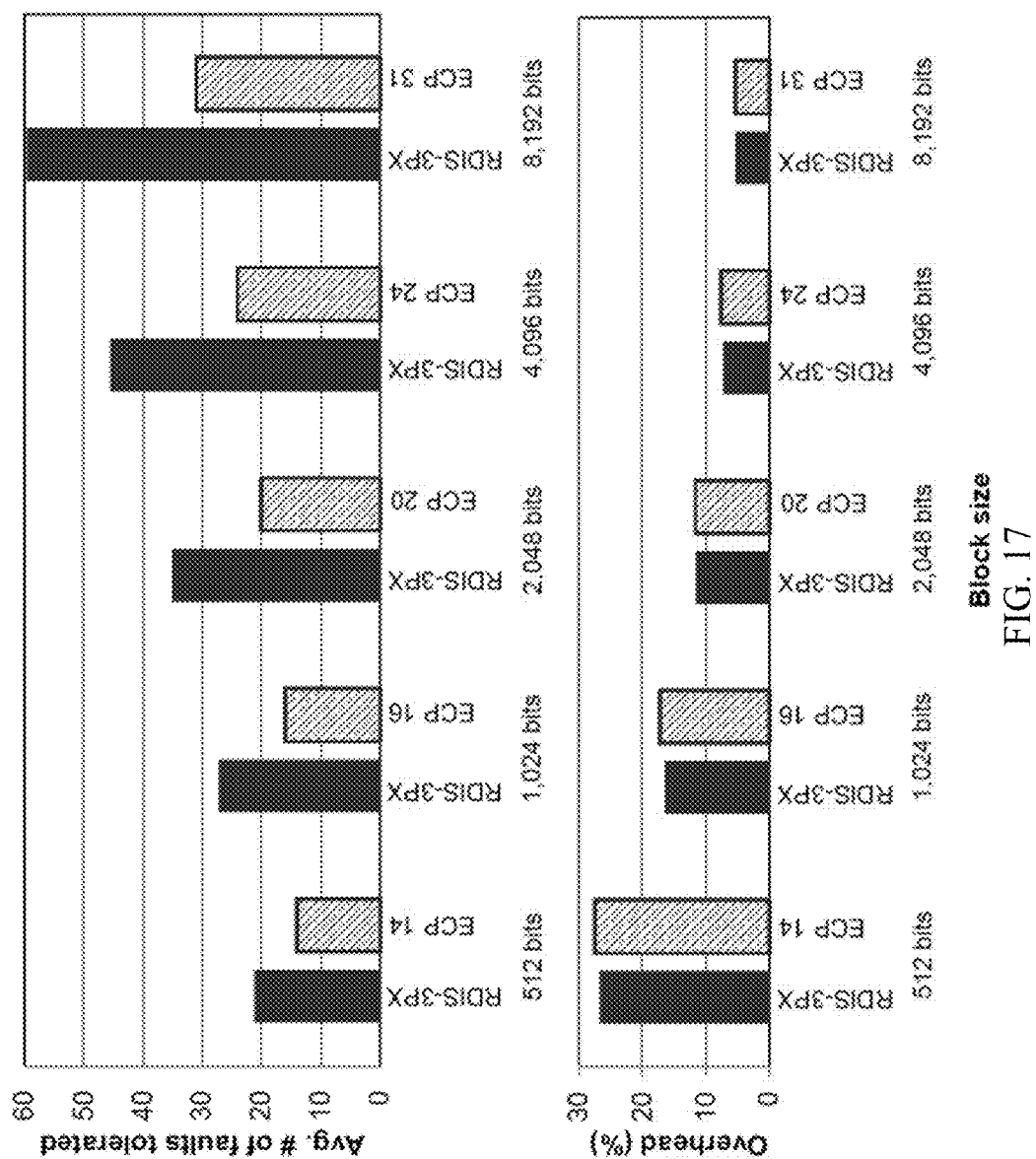
FIG. 17 illustrates the average number of faults tolerated by RDIS-3 with auxiliary information protection and different ECP configurations, indicating the above-mentioned results.

RDIS-3PX was compared against ECP itself. The minimum number of pointers, n, that made ECP's overhead larger than RDIS-3PX were assigned to ECP, and the scheme was denoted by ECP n. The overhead of ECP n when used to protect a block of N bits using n pointers is $n([\log_2 N]+1)+1$. For various block sizes, the probability of failure with F faults was studied, as was the average number of tolerated faults achieved by each scheme. FIG. 16 illustrates the probability of failure of RDIS-3PX and an ECP n with slightly larger overhead for different block sizes. When it comes to the probability of failure with F faults FIG. 16 shows that ECP cannot recover from faults beyond the provided number of correction pointers. However, RDIS techniques have remarkable tolerance of faults beyond what is guaranteed. Furthermore, RDIS exhibits a notably low probability of failure within the error free window of ECP. FIG. 17 illustrates the average number of faults tolerated by RDIS-3PX and different ECP configurations, indicating the above-mentioned results. For example, the RDIS technique tolerated up to 81% more faults with block size of 8,192 bits. It is to be noted that the average number of faults tolerated under the tested RDIS technique corresponded to faults occurring both in the protected block and the auxiliary bits.

The presented results make clear that RDIS techniques useable in accordance with aspects of the subject innovation can tolerate more faults with higher probability than previously proposed schemes using the same assumptions and fault model. RDIS techniques are particularly suited for large blocks of 128 bytes or more.

Figure 18:
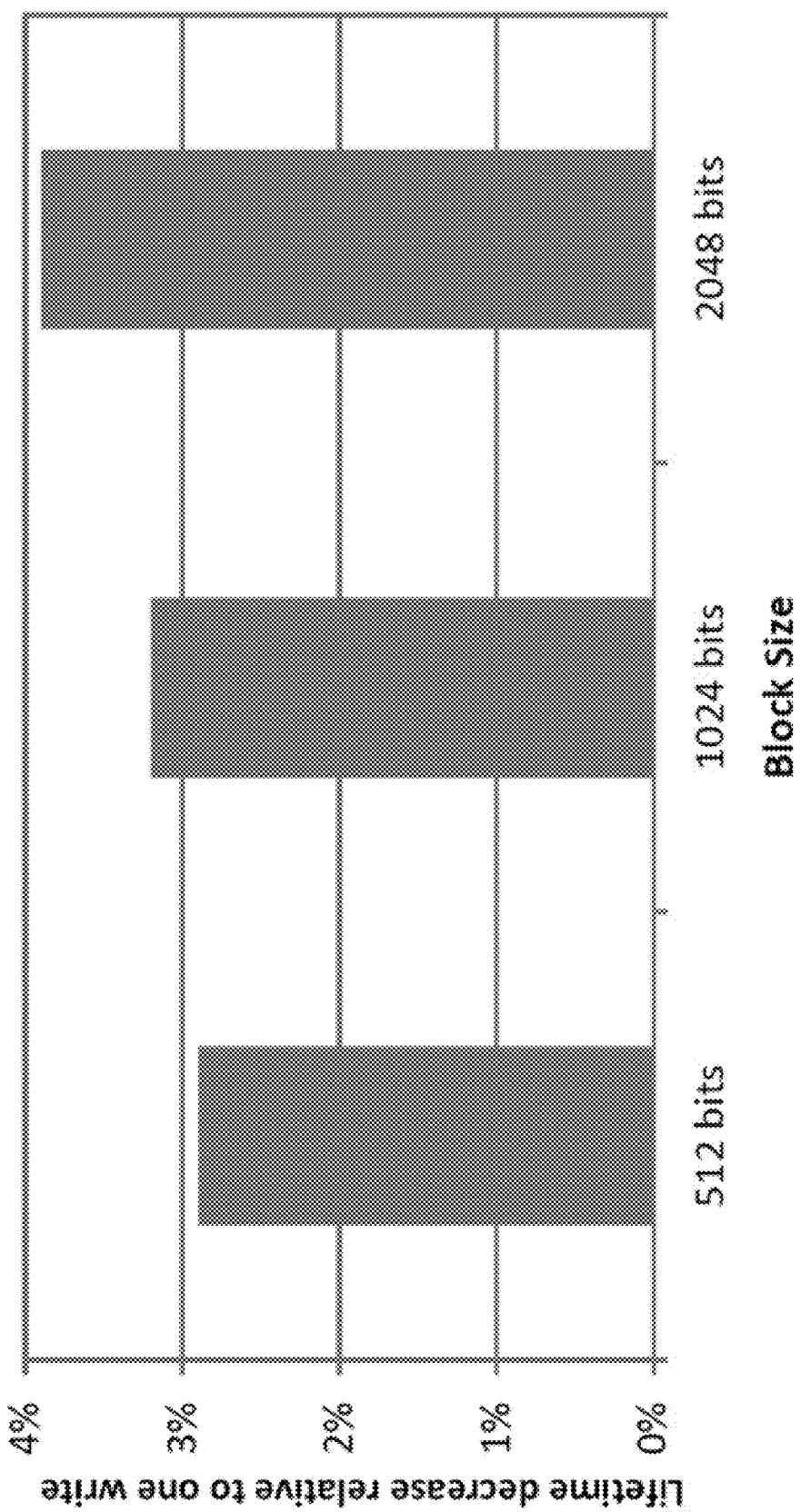
FIG. 18 illustrates a plot of the lifetime decrease in terms of the total number of writes executed when extra writes could occur relative to one write.

As discussed above, RDIS can employ extra write operations to reveal the fault information and mask erroneous cells. Those extra writes could exacerbate the endurance of non-faulty cells that happen to be on the intersection of a row and column both containing stuck-at faults (i.e. row-column connected). The effect of these extra writes on the lifetime of a memory block was studied. To this end, the number of writes that can be executed on a memory block was compared in two settings. The first assumed the fault information was cached; thus only one write operation was required. The second assumes no knowledge about the fault information; thus additional write operations are required. 2000 PCM blocks of various sizes were laid down and a lifetime was assigned to each cell drawn from a Gaussian distribution with mean 108 and standard deviation of $25 \times 10^6$. FIG. 18 illustrates a plot of the lifetime decrease in terms of the total number of writes executed when extra writes could occur relative to one write.

As can be seen in FIG. 18, the decrease in lifetime due to extra writes is notably low. This result can be attributed to the fact that row-connected cells are not always part of the initial mesh that an RDIS technique forms unless both row and column contain stuck-at wrong cells. Thus, extra writes to healthy row-connected cells happen occasionally due to the data dependent nature of errors i.e., stuck-at wrong. In the event that a row-connected cell wears-out earlier than expected due to extra writes, this cell is harmful only when it leads to the formation of a loop of faults or an RCA sequence of stuck-at cells. Therefore, the extra writes incurred by RDIS techniques do not harm the lifetime significantly. Nevertheless, a cache can still be beneficial to eliminate the performance overhead of the extra writes.

Figure 19:
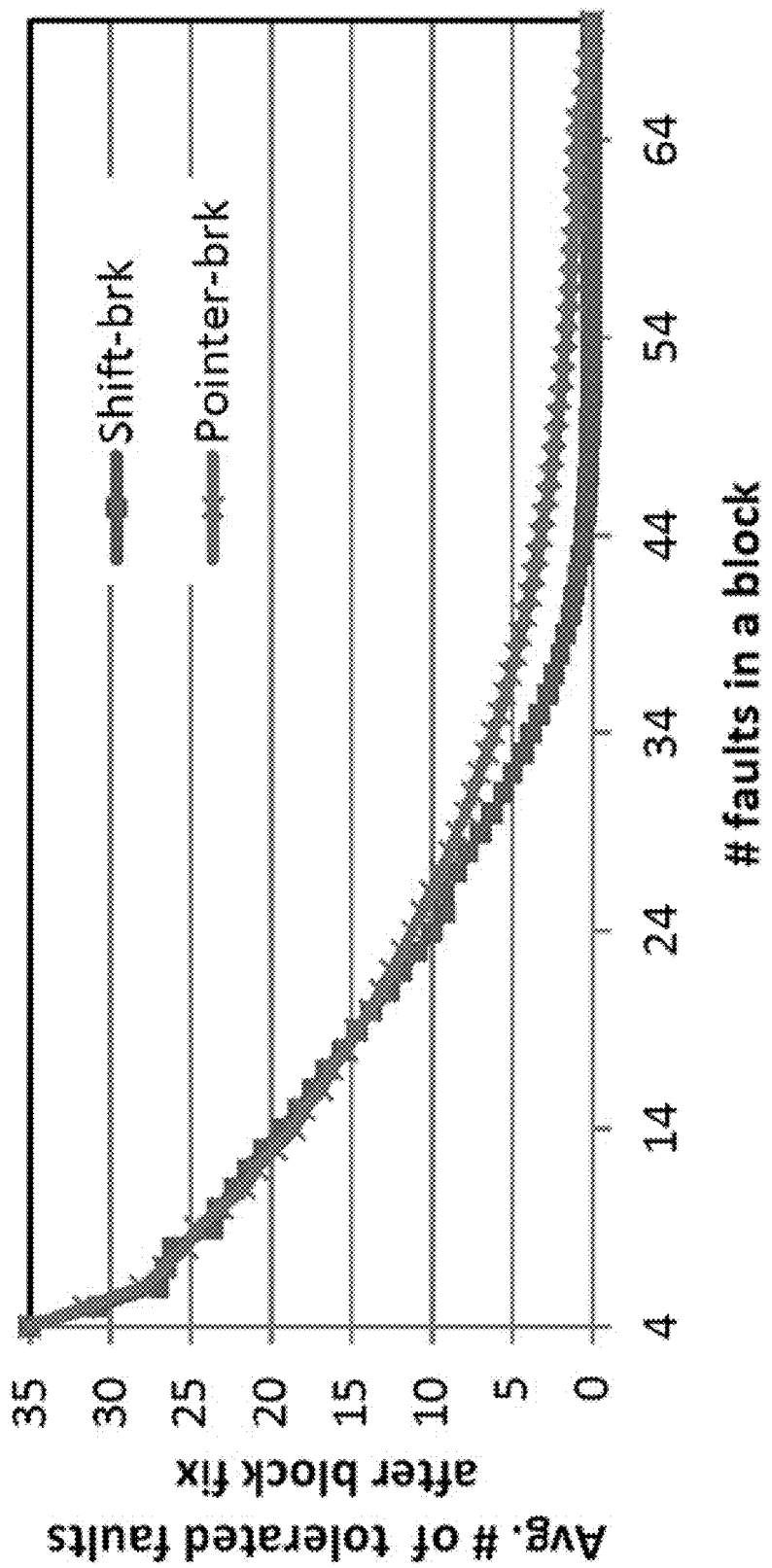
FIG. 19 illustrates the average number of additional faults tolerated after fixing a defective 2048-bit block via a shift break and via a pointer break.

As discussed above, aspects of the subject innovation can employ either or both of two techniques (shift breaks, pointer breaks) to break defective patterns that cause RDIS to halt. These two techniques were evaluated via Monte-Carlo simulation in terms of the average number of additional faults that can be tolerated after breaking a defective pattern with k faults already existing in a memory block. The simulation started with a block that was already defective, whether because of an RCA sequence or a loop of faults, where the block contained k faults. After that, the defective pattern was broken with both techniques, and the additional faults that could be tolerated in the block until a new defective pattern formed were recorded. The experiment was run four million times. FIG. 19 illustrates the average number of additional faults tolerated after fixing a defective 2048-bit block via a shift break and via a pointer break.

It is notable that both techniques are capable of significantly tolerating a large number of faults after fixing a block in which a defective pattern occurred with a relatively small number of faults. This finding is a direct consequence of the low probability of defectiveness that RDIS techniques exhibit with a small number of faults in the block. Hence, fixing a block that got defective with a small number of faults yields into a greater number of faults that can be tolerated after the fix.

In addition, it is notable that fixing a defective block with a pointer performs better when the number of faults in the protected block is high. By shifting the cells in a block, the defective pattern is broke. However, a new defective pattern could form due to the large number of faults already existing in the block. On the other hand, fixing a block with a pointer is guaranteed to break the defective pattern. Nevertheless, implementing the block fix technique with the shifting technique is simple and easy. It only requires one additional bit of overhead to indicate whether the data was written shifted or not and tolerates a significant number of additional faults.

Figure 20:
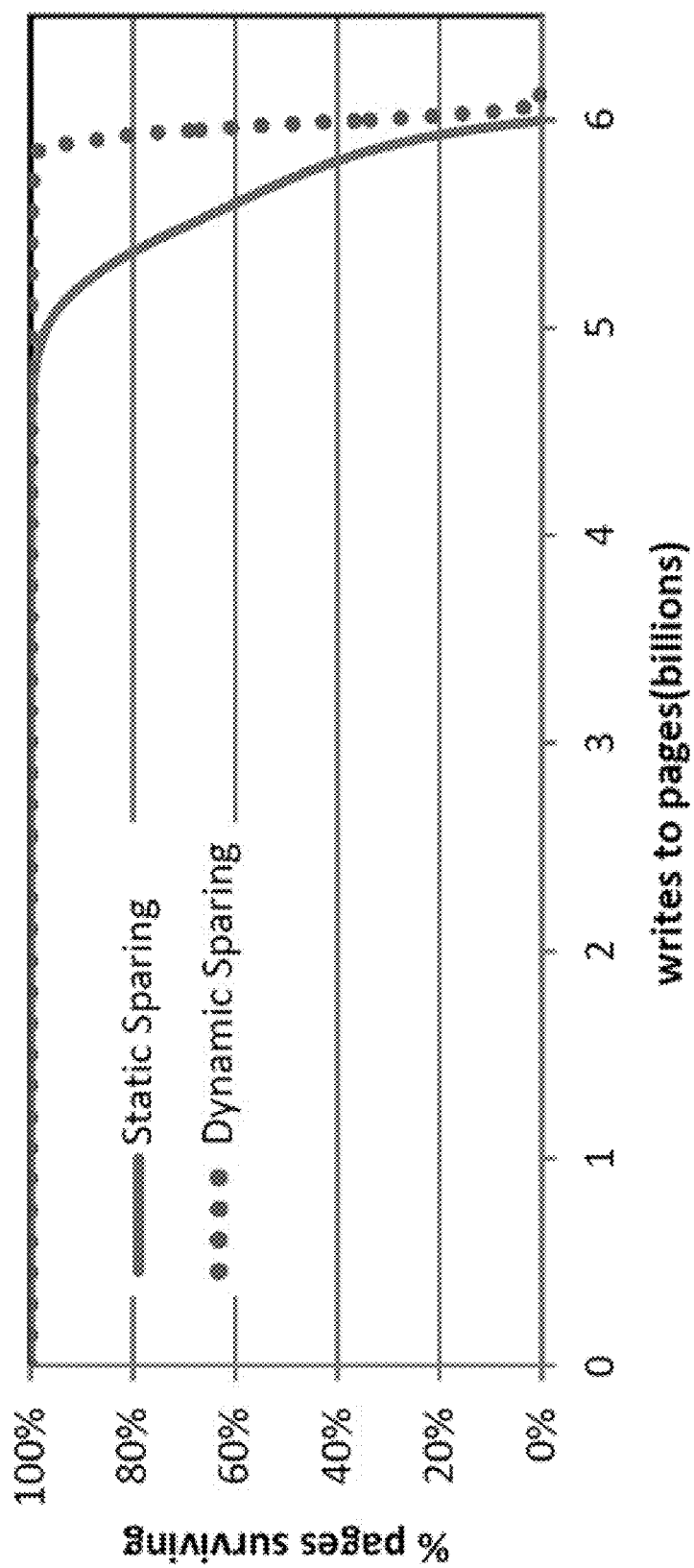
FIG. 20 illustrates the percent of pages surviving as a function of writes to the page for both static and dynamic sparing.

As discussed above, aspects of the subject innovation can couple RDIS techniques with data-dependent sparing. The effect of data-dependent sparing versus static sparing when coupled with RDIS were studied. To this end, 2000 physical pages each composed of 512-bits memory blocks were laid down. The Free-p approach was followed in assuming that the OS was responsible for dispatching a memory page that serves as a set of spares for defective blocks. Each cell was assigned a lifetime drawn from a normal distribution with mean 108 and standard deviation of $25 \times 10^6$. The simulation was run until all memory pages had been retired, i.e., all memory blocks became defective, and the total number of writes executed was recorded. FIG. 20 illustrates the percent of pages surviving as a function of writes to the page for both static and dynamic sparing.

The results of FIG. 20 show that coupling RDIS techniques with data-dependent sparing is capable of extending the life significantly compared to the static sparing approach. When RDIS techniques coupled with static sparing has retired around 50% of the blocks, RDIS techniques coupled with dynamic sparing still utilize 100% of the memory blocks. This finding is a direct consequence of the data-dependent nature of failures exhibited by RDIS techniques, where defective blocks can still be written reliably except with few specific data patterns.

The limited write endurance is the major weakness of emerging resistive memories. Accordingly, robust error recovery schemes are required to mask off hard errors and prolong the lifetime of a resistive memory chip. Aspects of the subject innovation can employ RDIS techniques, a recursively defined invertible set scheme to tolerate multiple stuck-at hard faults. Results demonstrate that RDIS can achieve a very low probability of failure on hard fault occurrences, which increases slowly with the relative increase in the number of faults. This characteristic allows RDIS to effectively recover from a large number of faults. For example, RDIS can recover from 46 hard faults on average when the block size is 512 bytes (storage sector size) while incurring a low overhead of 6.2%. Furthermore, realizing RDIS in hardware is fairly straightforward and is off the critical data access path, thus systems and methods employing RDIS techniques can be readily applied in connection with existing memory.

Given their high error tolerance potential, RDIS techniques can recover from the many faults in emerging resistive memories. Systems and methods of the subject innovation employing RDIS techniques can provide a very robust memory substrate to a system and can facilitate further development on effective integration and management of resistive memory capacity at higher levels, for better overall system performance and reliability.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a physical memory store comprising a plurality of cells, wherein one or more of the plurality of cells have permanent stuck-at faults;
a write/read component that receives a plurality of bits to be written to the plurality of cells;
a recursively determined invertible set (RDIS) component that identifies at least one stuck-at wrong (SA-W) cell from the plurality of cells that have permanent stuck-at faults based at least in part on values associated with the plurality of bits and at least one value associated with the at least one SA-W cell, wherein the RDIS component determines an invertible set that comprises the at least one SA-W cell; and
an auxiliary information store that maintains a plurality of auxiliary counters that specify the invertible set,
wherein the write/read component writes a bitwise complement to each cell in the invertible set and writes normally to each cell not in the invertible set, and wherein, upon a read operation, the write/read component reads a bitwise complement from each cell in the invertible set and reads normally from each cell not in the invertible set.

2. The system of claim 1, wherein the plurality of auxiliary counters are maintained in a second memory store not subject to permanent stuck-at faults.

3. The system of claim 1, wherein the plurality of auxiliary counters are protected via an error correcting technique.

4. The system of claim 1, wherein each of the plurality of auxiliary counters has a capacity of at least one.

5. The system of claim 1, wherein the memory store comprises at least one defective block, and wherein the RDIS component employs a shift break to determine the invertible set.

6. The system of claim 1, wherein the memory store comprises at least one defective block, and wherein the RDIS component employs a pointer break to determine the invertible set.

7. The system of claim 1, wherein the memory store comprises at least one defective block, and wherein the memory store is subjected to data-dependent sparing.

8. The system of claim 1, wherein the memory store comprises at least one defective block, and wherein the memory store is subjected to static sparing.

9. The system of claim 1, wherein the RDIS component identifies the at least one SA-W cell via a read-after-write operation performed by the write/read component.

10. The system of claim 1, wherein the RDIS component identifies the at least one SA-W cell based at least in part on fault data maintained in a separate cache.

11. A method, comprising:
    receiving a plurality of bits to write to a physical memory store comprising a plurality of cells;
    receiving fault information associated with the physical memory store, wherein the fault information identifies at least one stuck-at wrong (SA-W) cell from the plurality of cells based at least in part on the received plurality of bits;
    calculating an invertible set based at least in part on the received fault information, wherein the invertible set comprises the at least one SA-W cell;
    storing a plurality of auxiliary counters that specify the invertible set;
    writing a bitwise complement of a first subset of the plurality of bits to each cell in the invertible set;
    writing a second subset of the plurality of bits to each cell not in the invertible set;
    reading a bitwise complement from each cell in the invertible set;
    reading a stored value from each cell not in the invertible set; and
    returning the read bitwise complement from each cell in the invertible set and the stored value from each cell not in the invertible set.

12. The method of claim 11, wherein storing the plurality of auxiliary counters comprises storing the plurality of auxiliary counters in a second physical memory store that is free from stuck-at faults.

13. The method of claim 11, wherein the plurality of auxiliary counters are stored in the physical memory store, and further comprising protecting the plurality of auxiliary counters via an error correcting technique.

14. The method of claim 11, wherein calculating the invertible set comprises performing at least one iteration, wherein each iteration comprises determination of a subset associated with the iteration.

15. The method of claim 11, wherein calculating the invertible set comprises employing a shift break to repair a defective block of the physical memory store.

16. The method of claim 11, wherein calculating the invertible set comprises employing a pointer break to repair a defective block of the physical memory store.

17. The method of claim 11, further comprising employing data-dependent sparing to address at least one defective block of the physical memory store.

18. The method of claim 11, wherein receiving the fault information comprises receiving the fault information from a cache that is free from stuck-at faults.

19. The method of claim 11, wherein receiving the fault information comprises:
    writing the plurality of bits to the physical memory store;
    reading a value from each of the plurality of cells of the physical memory store; and
    comparing the read values to the plurality of bits.

20. A system, comprising:
    means for storing a plurality of bits, wherein the means for storing comprises one or more stuck-at faults;
    means for determining an invertible set that comprises at least one of the one or more stuck-at faults; and
    means for writing and reading, wherein the means for writing and reading writes a plurality of bits to the means for storing based at least in part on the invertible set, and wherein the means for writing and reading correctly reads the plurality of bits from the means for storing based at least in part on the invertible set.

* * * * *